United States Patent
Sethi et al.

(10) Patent No.: US 12,164,392 B1
(45) Date of Patent: Dec. 10, 2024

(54) METHOD AND SYSTEM FOR DATA CENTER DISASTER RECOVERY

(71) Applicant: Dell Products L.P., Round Rock, TX (US)

(72) Inventors: Parminder Singh Sethi, Ludhiana (IN); Anay Kishore, Bangalore (IN); Nithish Kn, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/319,556

(22) Filed: May 18, 2023

(51) Int. Cl.
G06F 11/14 (2006.01)
G06F 16/11 (2019.01)
G06F 16/182 (2019.01)

(52) U.S. Cl.
CPC ........ G06F 11/1469 (2013.01); G06F 16/122 (2019.01); G06F 16/128 (2019.01); G06F 16/1827 (2019.01); G06F 2201/84 (2013.01)

(58) Field of Classification Search
CPC ............. G06F 11/1451; G06F 11/1469; G06F 2201/84
USPC ........................................................ 707/604
See application file for complete search history.

(56) References Cited

U.S. PATENT DOCUMENTS

| | | |
|---|---|---|
| 6,195,760 B1 | 2/2001 | Chung et al. |
| 7,251,745 B2 | 7/2007 | Koch et al. |
| 7,401,248 B2 | 7/2008 | Nakahara et al. |
| 7,525,749 B2 | 4/2009 | Maejima et al. |
| 7,590,981 B2 | 9/2009 | Gupta et al. |
| 8,078,448 B1 | 12/2011 | Wohlberg et al. |
| 8,364,799 B2 | 1/2013 | Sakai |
| 8,918,673 B1 | 12/2014 | Rangaiah et al. |
| 9,495,381 B2 | 11/2016 | Shvachko |
| 10,929,428 B1 | 2/2021 | Brahmadesam et al. |
| 11,595,269 B1 | 2/2023 | Ghosh et al. |

(Continued)

FOREIGN PATENT DOCUMENTS

| | | |
|---|---|---|
| WO | 2021122516 A1 | 6/2021 |
| WO | 2022104396 A1 | 5/2022 |

OTHER PUBLICATIONS

Wu, Suzhen et al., Proactive Data Migration for Improved Storage Availability in Large-Scale Dat Centers, IEEE (Year: 2015) 15 pages.

*Primary Examiner* — Hung T Vy
(74) *Attorney, Agent, or Firm* — Chamberlain, Hrdlicka, White, Williams & Aughtry; Aly Dossa

(57) ABSTRACT

A method for recovering a data center, includes making a determination, by a cloud module, that the data center has experienced a failure; sending, by the cloud module and in response to the determination, an infrastructure file including data center infrastructure information to a client device; receiving, after sending the infrastructure file, a confirmation from the client device that at least a portion of the data center infrastructure is installed; sending, from the cloud module to the data center module, a snapshot in response to the confirmation; deploying, by the data center module, the snapshot at the data center; validating, by the data center module, complete connectivity of data center; sending, by the data center module, a heartbeat signal to the cloud module in response to the validating; and sending, by the cloud module, a standby signal to disaster recovery resources in response to receiving the heartbeat signal.

20 Claims, 11 Drawing Sheets

(56) References Cited

U.S. PATENT DOCUMENTS

| | | |
|---|---|---|
| 11,846,918 B1 | 12/2023 | Mazur |
| 2002/0138226 A1 | 9/2002 | Doane |
| 2005/0216800 A1 | 9/2005 | Bicknell et al. |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2008/0222218 A1 | 9/2008 | Richards et al. |
| 2009/0307522 A1 | 12/2009 | Olson et al. |
| 2011/0066879 A1* | 3/2011 | Nakai ................ G06F 8/63 718/1 |
| 2011/0113224 A1 | 5/2011 | Isshiki et al. |
| 2012/0072571 A1 | 3/2012 | Orzell et al. |
| 2013/0103977 A1 | 4/2013 | Zimmermann |
| 2014/0376385 A1 | 12/2014 | Boss et al. |
| 2015/0019909 A1* | 1/2015 | Griffith ............ G06F 11/1662 714/15 |
| 2015/0261518 A1 | 9/2015 | Viswanathan |
| 2015/0278219 A1 | 10/2015 | Phipps |
| 2016/0048408 A1 | 2/2016 | Madhu et al. |
| 2016/0162280 A1 | 6/2016 | Murayama et al. |
| 2016/0239395 A1 | 8/2016 | Madsen et al. |
| 2018/0113728 A1 | 4/2018 | Musani et al. |
| 2018/0239677 A1 | 8/2018 | Chen |
| 2018/0262979 A1 | 9/2018 | Wang et al. |
| 2019/0199687 A1 | 6/2019 | Lan |
| 2019/0310872 A1 | 10/2019 | Griffin |
| 2020/0110655 A1 | 4/2020 | Harwood et al. |
| 2020/0110675 A1* | 4/2020 | Wang ................ G06F 11/2028 |
| 2020/0133772 A1 | 4/2020 | Dalmatov et al. |
| 2020/0156243 A1 | 5/2020 | Ghare et al. |
| 2020/0264930 A1 | 8/2020 | Mandagere et al. |
| 2021/0165768 A1 | 6/2021 | D'halluin et al. |
| 2022/0070648 A1 | 3/2022 | Krishan |
| 2022/0075613 A1 | 3/2022 | Ramachandran |
| 2022/0138081 A1 | 5/2022 | Varma et al. |
| 2022/0158926 A1 | 5/2022 | Wennerström et al. |
| 2022/0164186 A1 | 5/2022 | Pamidala |
| 2022/0179683 A1 | 6/2022 | Verma et al. |
| 2022/0337493 A1 | 10/2022 | Sant et al. |
| 2023/0037124 A1 | 2/2023 | Mengwasser et al. |
| 2023/0080047 A1 | 3/2023 | Bashir |

* cited by examiner

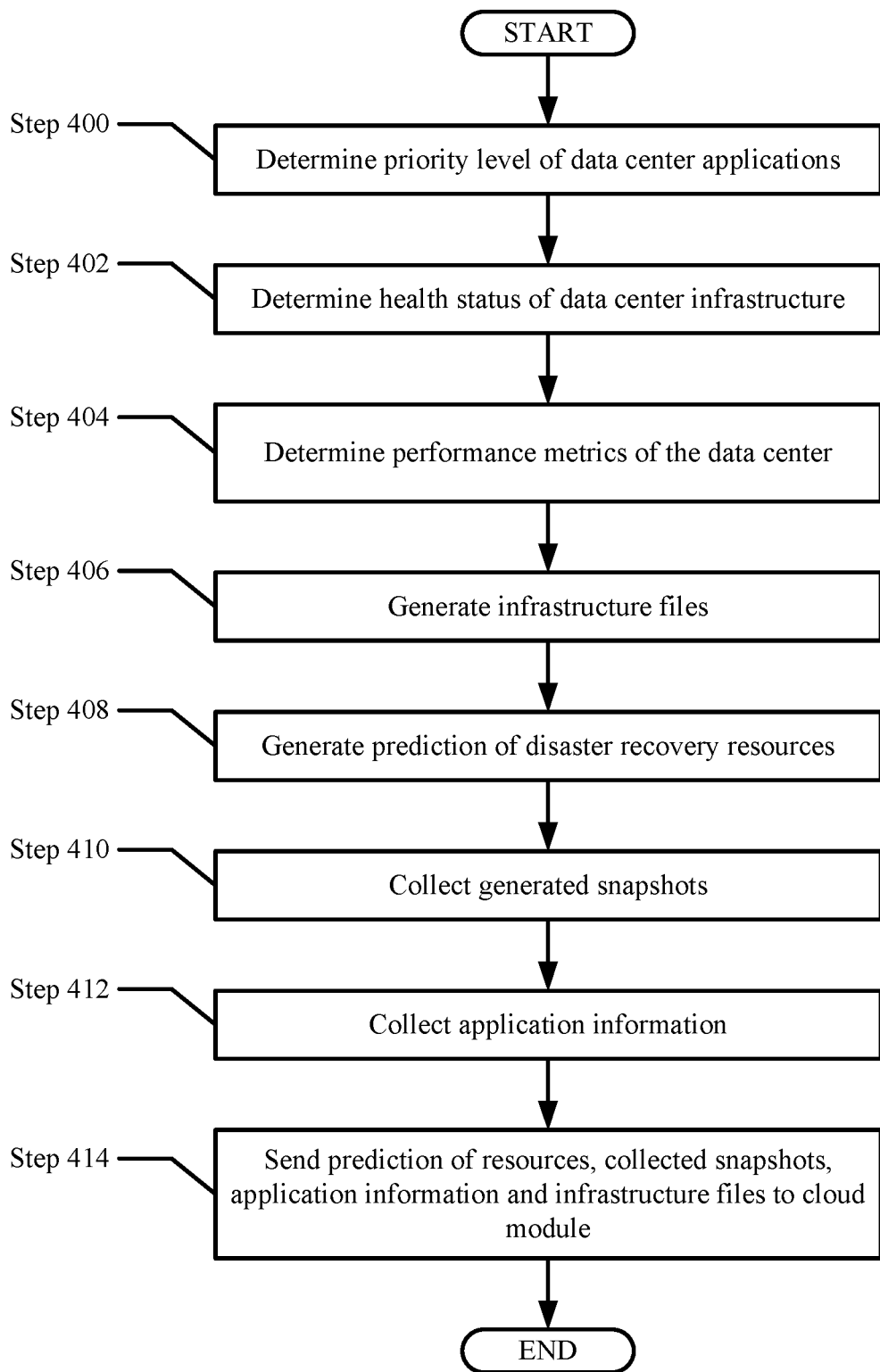
FIG. 4.1

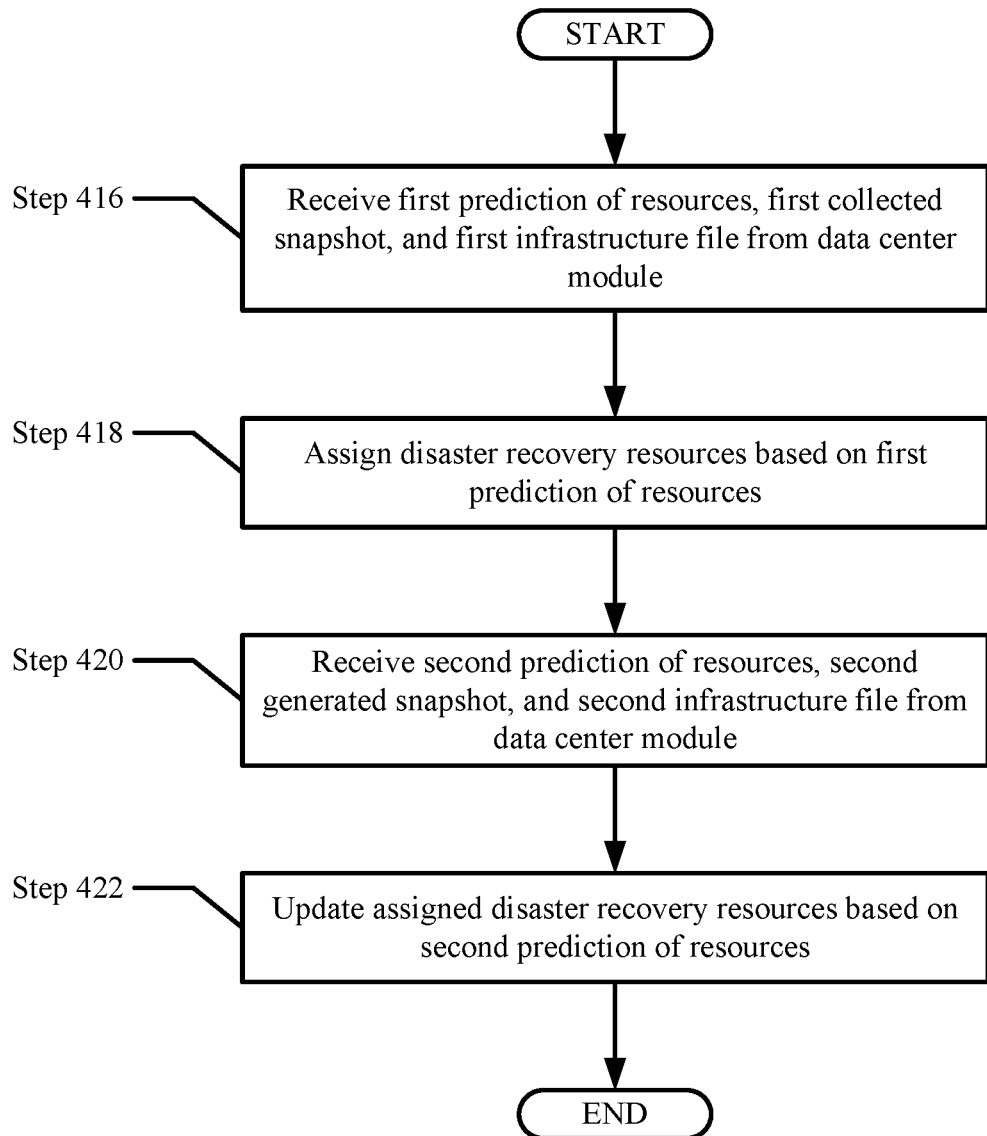
FIG. 4.2

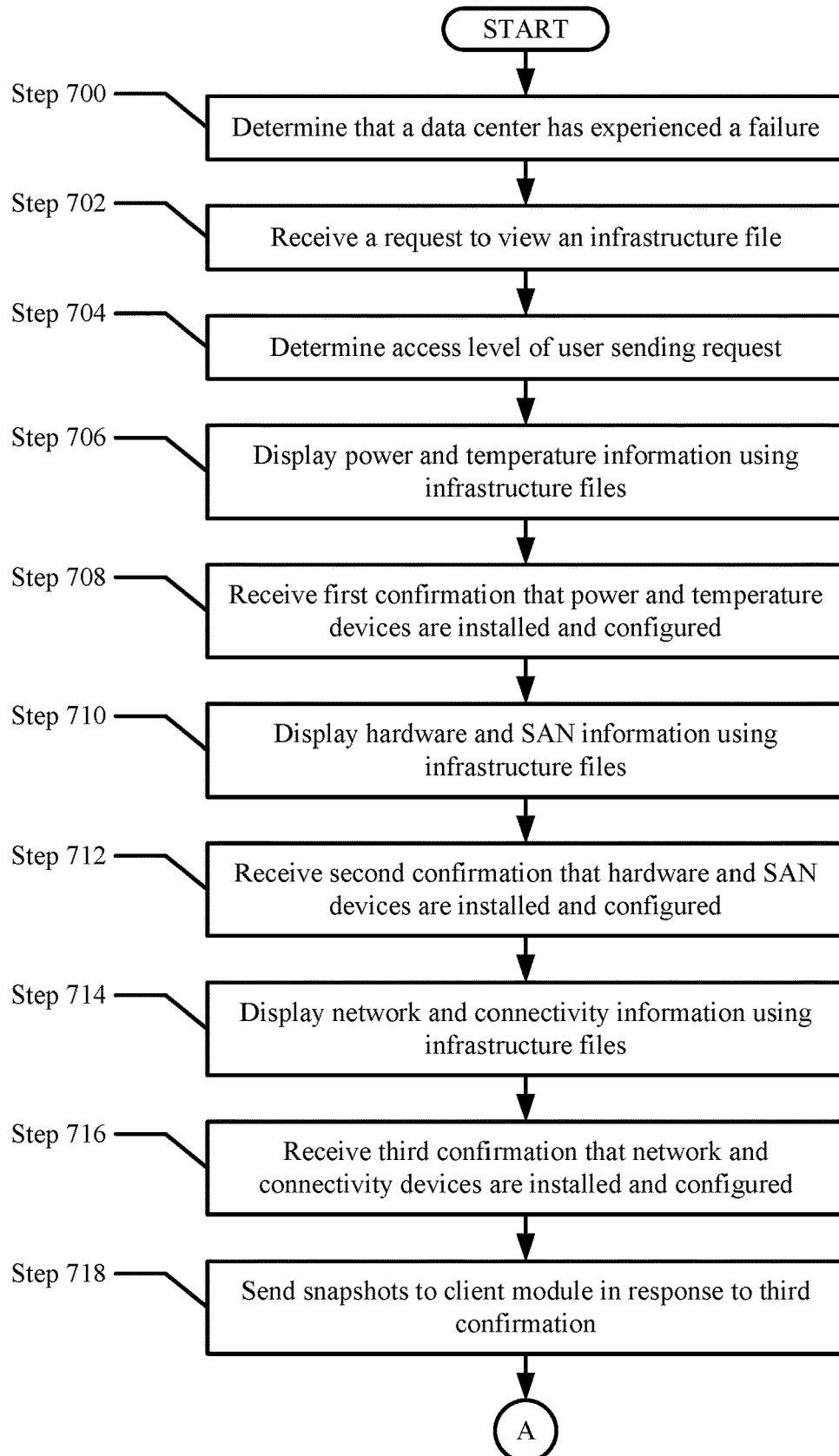
FIG. 7.1

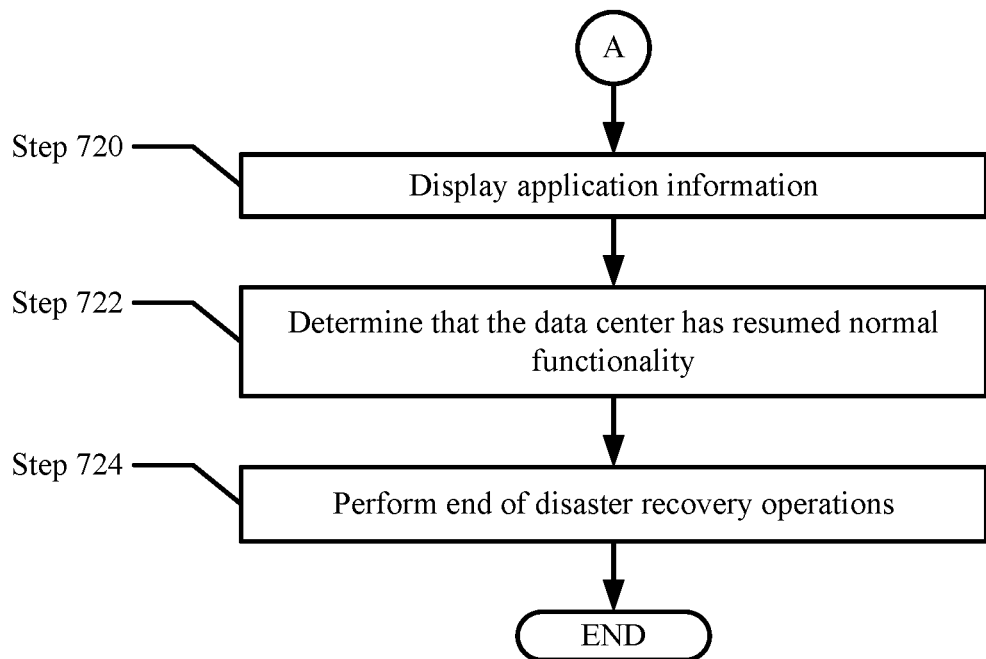
FIG. 7.2

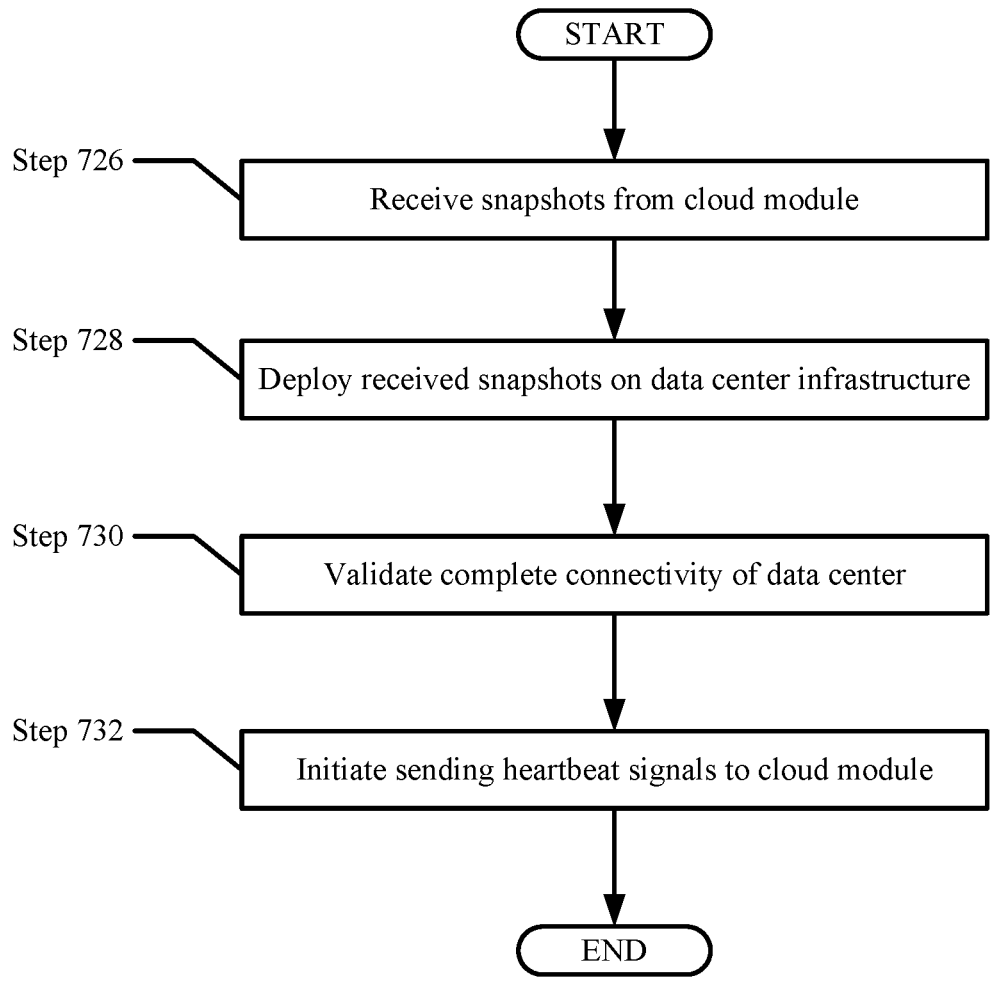
FIG. 7.3

METHOD AND SYSTEM FOR DATA CENTER DISASTER RECOVERY

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1-4.2 show a method in accordance with one or more embodiments of the invention.

FIGS. 7.1-7.3 show a method in accordance with one or more embodiments of the invention.

DETAILED DESCRIPTION

Figure 1:
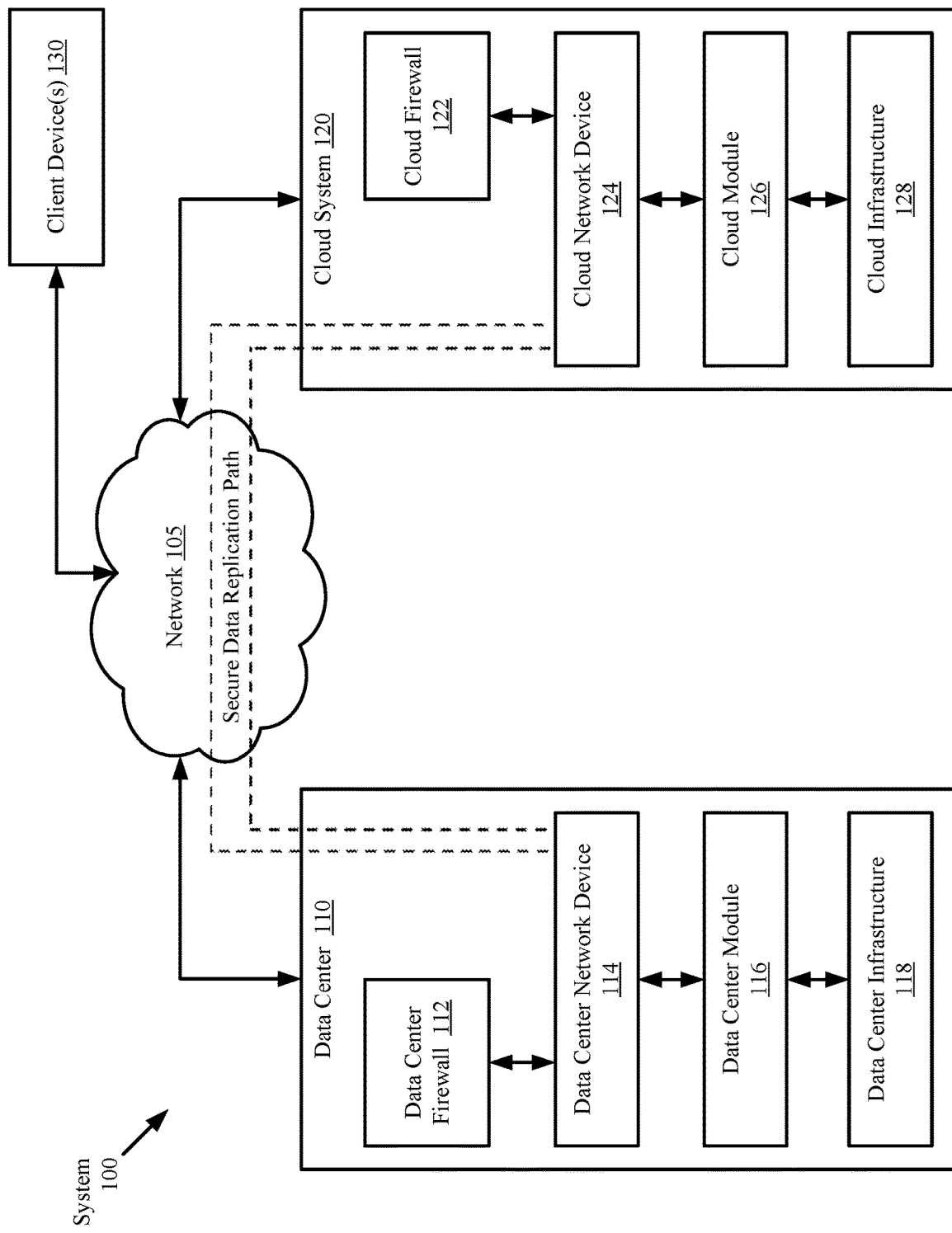
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a data centers are utilized to store various different types of data (e.g., business-critical information, implementation details, information subject to government regulations, etc.) that an organization (e.g., a corporate) might need for, for example, servicing client requests. As organizations reach out to different geographical regions of the world with their diversified business models, the need for diversifying data centers of those organizations and applications executing on them arises. In most cases, geographically distributed data centers may need to operate synchronously so that there is no gap (or inconsistency) with respect to data available on different computing devices (e.g., clients, systems, etc.) that perform production workloads (e.g., reading data from assets, writing data to the assets, etc.) based on that data. While keeping data synchronized across those data centers, vendors (or administrators) of those data centers may also need to make sure that the process of data synchronization is efficient and secure (e.g., tamper-proof). In this manner, (i) any possible latency (for example, during a data retrieval operation) may be kept at a minimum level, and (ii) data integrity and availability may be kept at a maximum level.

As described above, organizations may have a business presence in various different continents, countries, and business industries (e.g., airline industry, medical industry, analytics industry, etc.) around the world and, thus, they need their data (e.g., application data, user data, etc.) to be always available in respective local computing systems for executing their operations with maximum efficiency. For this reason, with an increased need for data availability and integrity, the challenges related to keeping data secure and tamper-free are vital, and need to be resolved.

Embodiments herein relate to methods and systems generally relate to disaster recovery operations. For instance, in the event that a data center become unavailable due to a natural or manmade disaster, data centers may experience failures and become unavailable. Embodiments herein relate to methods and systems to define sets of automated guidelines that may be followed so that the impact of a failed data center is minimized. Embodiments herein relate to methods and systems that automatically plans for and implements disaster recovery operations.

The following describes various embodiments of the invention.

FIG. 1 shows a diagram of a system (100) in accordance with one or more embodiments. The system (100) includes any number of client devices (130), a data center (110), which may include any number of data centers, a network (105), and a cloud system (120). The system (100) may include additional, fewer, and/or different components without departing from the scope of the embodiments disclosed herein. Each component may be operably connected to any of the other components via any combination of wired and/or wireless connections. Each component illustrated in FIG. 1 is discussed below.

In one or more embodiments, the client device(s) (130), the data center (110), the cloud system (120), and the network (105) may be physical or logical devices, as discussed below. The data center (110) may be operably connected to the cloud system (120) via the network (105), in which the network (105) may allow the data center (110) (e.g., components of the data center (110)) to communicate with the cloud system (120) (e.g., components of the cloud system (120)). In one or more embodiments, a data center firewall (112), a data center network device (114), a data center module (116), and data center infrastructure (118) may collectively be referred to as "components of the data center (110)". Similarly, in one or more embodiments a cloud firewall (122), a cloud network device (124), a cloud module (126), and cloud infrastructure (128) may collectively be referred to as "components of the cloud system (120)".

While FIG. 1 shows a specific configuration of the system (100), other configurations may be used without departing from the scope of the invention. For example, although the data center (110) and the cloud system (120) are shown to be operatively connected through the network (105), the data center (110) and the cloud system (120) may be directly connected, without an intervening network (e.g., 105). Further, the data center (110) and the cloud system (120) may include any further number of data centers that each include the components illustrated in FIG. 1. For example, a third data center may also include a firewall, a network device, a module, and an infrastructure, among other things.

Further, the functioning of the data center (110) and the cloud system (120) is not dependent upon the functioning and/or existence of the other components (e.g., devices) in the system (100). Rather, the data center (110) and the cloud system (120) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the client device(s) (130). The system (100) may also represent a comprehensive middleware layer executing on computing devices (e.g., 400, FIG. 4) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, networking resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), the data center (110) and/or the cloud system (120) may be configured for hosting and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, the data center (110) of an organization may exchange data with other data centers of the same organization registered in/to the network (105) in order to, for example, participate in a collaborative workload placement. As yet another example, the data center (110) may split up a request (e.g., an operation, a task, an activity, etc.) with another data center, coordinating its efforts to complete the request (e.g., to generate a response) more efficiently than if the data center (110) had been responsible for completing the request. One of ordinary skill will appreciate that the data center (110) may perform other functionalities without departing from the scope of the invention.

Further, the data center (110) of an organization may also exchange data with the cloud system (120), which may be maintained by another organization, provides additional resources (e.g., processing resources, storage resources, networking resources, etc.) to the data center (110), or, more generally, to the operations of the organization. As yet another example, the cloud system (120) provides disaster recovery operations as a service when the data center (110) becomes unavailable.

In one or more embodiments, the data center (110) and/or the cloud system (120) may be capable of providing the aforementioned functionalities/services to the user of the clients. However, not all of the users may be allowed to receive all of the services. For example, the priority (e.g., the user access level) of a user may be used to determine how to manage computing resources within the data center (110) and/or the cloud system (120) to provide services to that user. As yet another example, the priority of a user may be used to identify the services that need to be provide to that user. As yet another example, the priority of a user may be used to determine how quickly communications (for the purposes of providing services in cooperation with the network (105) (and its subcomponents)) are to be processed by the network (105).

Further, the data center (110) and/or the cloud system (120) may support various applications, each with an associated priority level. For example, the priority level of an application may be used to determine how to manage computing resources within the data center (110) and/or the cloud system (120) to provide services for that application. As yet another example, the priority of an application may be used to identify the resources that need to be provided to that application. As yet another example, the priority level of an application may be used to determine how quickly communications (for the purposes of providing services in cooperation with the network (105) (and its subcomponents)) are to be processed by the network (105).

As used herein, "network traffic" is an amount of data moving across a network (e.g., 105) at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, the data center (110) and/or the cloud system (120) may include, for example (but not limited to): a router, a switch, a firewall, a module, infrastructure, a server, an application-delivery controller, a network device, etc. The data center (110) and/or the cloud system (120) may support business applications and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

In one or more embodiments, the components (described above) of the data center (110) and/or the cloud system (120) provide, at least, (i) network infrastructure (which connects servers (physical and/or virtualized), data center services, storage, and external connectivity to end-user locations (e.g., clients)), (ii) storage infrastructure), and (iii) computing resources (e.g., processing, memory, local storage, network connectivity, etc.) that drive applications.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer (e.g., to determine) SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, the term "backup" is intended to be broad in scope. In this manner, example backups in connection with which embodiments of the invention may be employed include (but not limited to): full backups, partial backups, clones, replications, snapshots, incremental backups, differential backups, etc.

As used herein, a "server" may be a physical computing device or a logical computing device (e.g., a VM) and may include functionality to: (i) provide computer-implemented services (e.g., receiving a request, sending a response to the request, etc.) to one or more entities (e.g., users, components of the system (100), etc.) and (ii) exchange data with other components registered in/to the network (105) in order to, for example, participate in a collaborative workload placement.

For example, a server may split up a request with another component of the system (e.g., 100, FIG. 1), coordinating its efforts to complete the request (e.g., to generate a response) more efficiently than if the server had been responsible for completing the request. In one or more embodiments, a request may be, for example (but not limited to): a web browser search request, a representational state transfer (REST) request, a computing request, a database management request, etc. To provide the computer-implemented services to the entities, the server (e.g., an enterprise server, a modular server, a blade server, a mainframe, a workstation computer, etc.) may perform computations locally and/or remotely. By doing so, the server may utilize different computing devices (e.g., 800, FIG. 8) that have different quantities of computing resources (e.g., processing cycles, memory, storage, etc.) to provide a consistent experience to the entities. In one or more embodiments, the server may be a heterogeneous set, including different types of hardware components and/or different types of OSs.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 800, FIG. 8), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments that embodiments of the invention may be employed include (but not limited to): Microsoft® Azure, Amazon® AWS, Dell® Cloud Storage Services, Google® Cloud, etc.

In one architecture (e.g., the "unidirectional" architecture), one of the data centers (e.g., the parent data center) of an organization may be deployed to the United States, which serves (e.g., shares) data to/among the remaining data centers (e.g., the child data centers that are deployed to Argentina, India, and France) of the organization. In this architecture, the child data centers may transmit their data to the parent data center so that the parent data center is always updated. Thereafter, the parent data center may distribute/forward received data to the child data centers to keep the child data centers equally updated.

In another architecture (e.g., the "bidirectional" architecture), one of the data centers of an organization may be deployed to Greece and the other one may be deployed to Spain, in which both data centers know each other and when a data change is occurred in one of them, the other data center may automatically obtain that data to stay updated. Further, in another architecture (e.g., the "multidirectional" architecture), an organization may have multiple data centers deployed around the world and all of the data centers know each other. When one of the data centers is updated (e.g., when that data centers receives a software package), the remaining data centers are updated accordingly (e.g., by sending a data transfer request to each of the remaining data centers).

Figure 8:
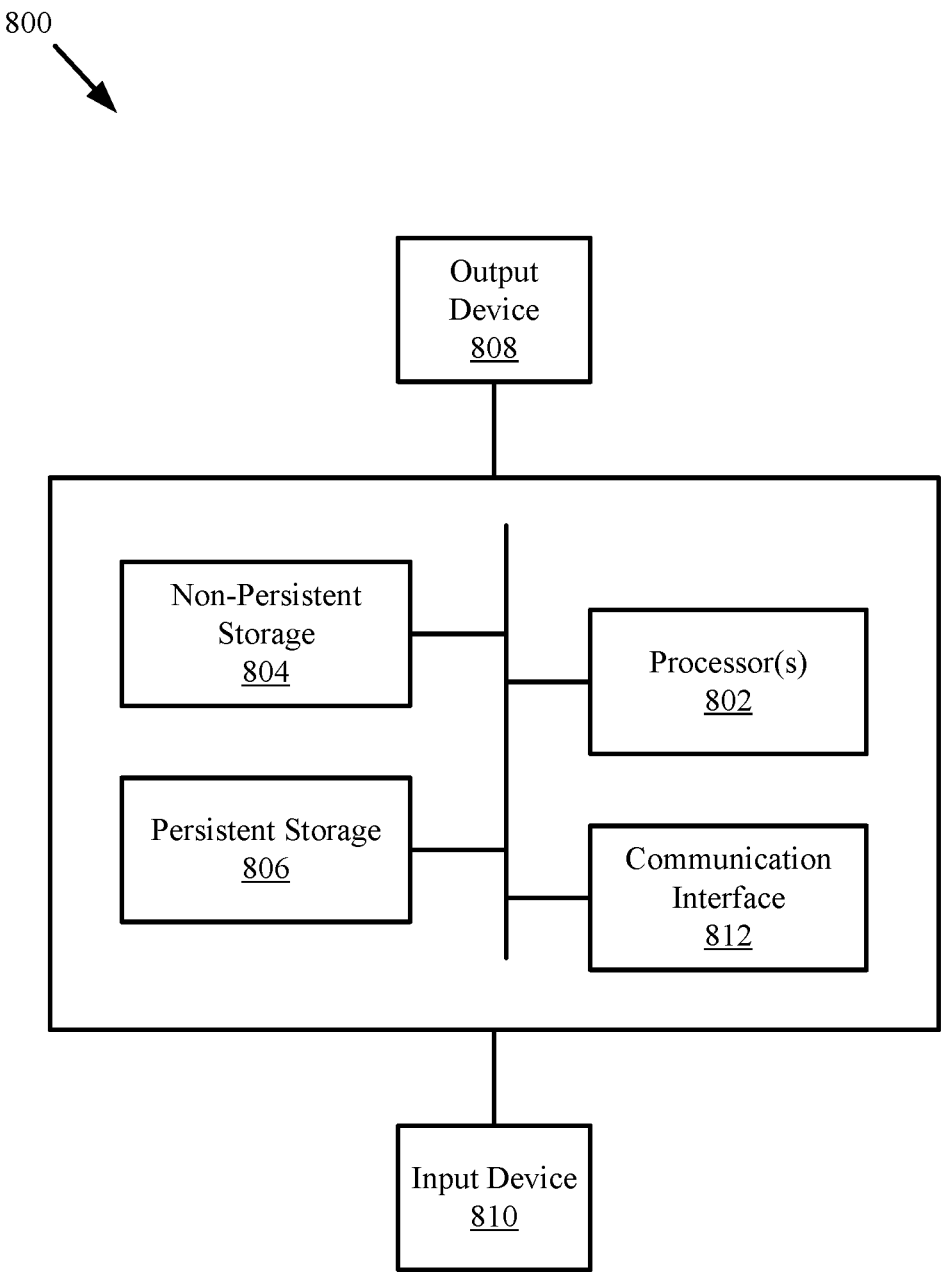
FIG. 8 shows a diagram of a computing device in accordance with one or more embodiments of the invention.

In one or more embodiments, the data center (110), the cloud system (120), and/or the client device(s) (130) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data center described throughout this application.

Alternatively, in one or more embodiments, the data center (110), the cloud system (120), and/or the client device(s) (130) may be implemented as a logical device. The logical device may utilize the computing resources of any number of computing devices to provide the functionality of the data center (110), the cloud system (120), and/or the client device(s) (130) described throughout this application.

In one or more embodiments, as described above, the data center (110) and/or the cloud system (120) includes a firewall (e.g., data center firewall (112) and cloud firewall (122)), a network device (e.g., data center network device (114) and cloud network device (124)), one or more modules (e.g., data center module (116) and cloud module (126)), and an infrastructure (e.g., data center infrastructure (118) and cloud infrastructure (128)).

In one or more embodiments, the firewall (e.g., 112, 122, etc.) is a network monitoring/security component that monitors all incoming and outgoing network traffic (e.g., requests, responses, calls, etc.), in which it decides whether to allow or block specific network traffic based on a defined set of security rules. A firewall may be, for example (but not limited to): a hardware component, a software component, a software as-a-service (SaaS), a private cloud, etc. The aforementioned example is not intended to limit the scope of the invention.

A firewall (e.g., 112, 122, etc.) may include functionality to monitor (e.g., track) network traffic in the network (105) to obtain a dataset. In one or more embodiments, the dataset may include, for example (but not limited to): a request (e.g., an application programming interface (API) call), a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API (e.g., application data 1 and 2 are being used by API X to change locations of both data in the file system), a list of operations that is being done on application data (e.g., while renaming application data 2, API X encrypted application data 2; after encrypting, API X duplicated and modified application data 2), a usage level (e.g., 50 times in 1 hour, 10 times in 1 minute, etc.) of an application data by an API, a period of time within which application data is being used by an API, etc.

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, a request and a response to that request may be communicated over the network (105). In one or more embodiments, corresponding response time for a request may be a period of time, with a definite start and end, within which a response process is set to be completed.

In one or more embodiments, a firewall (e.g., 112, 122, etc.) may periodically obtain the dataset from the network traffic. The firewall may also obtain the dataset from the network traffic in real-time. The firewall may then store (temporarily or permanently) the dataset in a storage/memory resource (e.g., in the data center infrastructure (118) and/or the cloud infrastructure (128)).

In one or more embodiments, a firewall (e.g., 112, 122, etc.) may also monitor the network traffic to determine, for example (but not limited to): availability of the network (105), unusual activities (e.g., exploitation events) on the network (105), etc. In most cases, an unusual activity on the network (105) may be a sign of a security issue (e.g., a malicious attack, distributed denial of service (DDOS) attack, malware attack, etc.). Because of the determined unusual activity, the firewall may notify an administrator (e.g., a network service provider (NSP)) of the network (105). Based on receiving the notification from the firewall, the NSP of the network (105) may reconfigure the network (105) to fix the security issue.

In one or more embodiments, because of increased network traffic, a firewall (e.g., 112, 122, etc.) may detect latency (e.g., delay) in the network (105). Because of the latency (e.g., 35 ms latency Quality of Service (QOS) network connection), the firewall may also notify the NSP. Based on receiving the notification from the firewall, the NSP may also reconfigure the network (105) to minimize the latency (e.g., the time it takes for data packets/packages to be transmitted, stored, or retrieved).

In one or more embodiments, the firewall may detect latency in the network traffic because of, for example (but not limited to): an increased amount of requests, an increased amount of responses, an increase in a size of a request, an increase in a size of a response, etc. One of ordinary skill will appreciate that a firewall (e.g., 112, 122, etc.) may perform other functionalities without departing from the scope of the invention.

In one or more embodiments, a firewall (e.g., 112, 122, etc.) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the firewall described throughout this application. Alternatively, in one or more embodiments, the firewall may also be implemented as a logical device.

In one or more embodiments, a network device (e.g., 114, 124, etc.) may be any type of network device (e.g., a switch, a router, etc.) that enables computing devices to communicate with other computing devices in a network environment. The network device (e.g., 114, 124, etc.) may include functionality to, e.g.: (i) use information (e.g., network use information, network configuration information that specify any number of configurations for a network device to provide its functionalities with a high configurability, etc.) included in a provided services repository (not shown) to determine how to provide/configure its respective services (for example, (a) the repository may specify identifiers of services and corresponding ports for the network device and (b) the repository may specify how to configure a network device at any level of granularity), (ii) based on a request received from a module (e.g., 116, 126, etc.), generating a secure data path (e.g., a secure tunnel) across the network (105), (iii) perform any number and type of communications schemes (e.g., Internet protocol (IP) communications, Ethernet communications, etc.), (iv) being configured by other computing devices, and (v) limiting communications on a granular level (e.g., on a per port level, on a per sending device level, etc.) via filtering or other methodology.

In one or more embodiments, the provided services repository may be maintained by, for example, the infrastructure (e.g., 118, 128, etc.). The infrastructure may include functionality to add, remove, and/or modify information included in the provided services repository. The infrastructure may do so based on information or a request/call obtained from administrators, other data structures, and/or from other sources (e.g., a module (e.g., 116, 126, etc.)). The data structures of the provided services repository may be implemented using, for example, lists, tables, unstructured data, databases, etc. While described as being stored locally, the provided services repository may be stored remotely and may be distributed across any number of devices without departing from the invention.

In one or more embodiments, the network device (e.g., 114, 124, etc.) may provide compression of network traffic at any level of a network stack or at any protocol (or network layer). The network device may also provide transport layer protocol optimizations (e.g., transport control protocol (TCP) optimizations), flow control, performance, modifications and/or management to accelerate delivery of applications and data, for example, (i) over a wide area network (WAN) connection, (ii) for any session, or (iii) for any application layer.

In one or more embodiments, the network device (e.g., 114, 124, etc.) may act as any type and form of transport control protocol or transport layer terminating device, such as a gateway or a firewall. For example, a network device (e.g., 114) may terminate a transport control protocol by establishing a transport control protocol connection with a second network device (e.g., 124). As yet another example, a network device (e.g., 114) may terminate a transport control protocol by managing the behavior of the transport control protocol connection between the network device (e.g., 114) and a second network device (e.g., 124), in which the network device (e.g., 114) may change, queue, or transmit network packets to effectively terminate the transport control protocol connection.

In one or more embodiments, the network devices (e.g., 114, 124, etc.) may, at least, (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) set up efficient and secure connections (e.g., a virtual private network (VPN) connection (or a trust relationship), a secure socket layer VPN (SSL VPN) connection, an IP security (IPSec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and (v) in some cases, enable users to bypass firewalls (e.g., provide endpoint-to-endpoint connections across a hybrid network without opening firewall rules in an enterprise network). To this end, the network device (e.g., 114, 124, etc.) may include any logic, functions, rules, or operations to perform services or functionalities (for communications between the data center (110) and the cloud system (120)) such as, for example, SSL VPN connectivity, SSL offloading, switching/load balancing, hypertext transfer protocol secure (HTTPS)-encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling. TCP multiplexing, TCP buffering, caching, etc.).

As used herein, in networking, "tunneling" is a way for transporting data across a network (e.g., 105) using protocols (standardized set of rules for (i) formatting and processing data, and (ii) enabling computing devices to communicate with one another) that are not supported by that network. In general, a "secure tunnel" refers to a group of microservices that includes, for example (but not limited to): a user interface (UI) server service, an API server service, a controller service, a tunnel connection service, an application mapping service, etc.

Tunneling works by encapsulating packets (packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, where the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

In one or more embodiments, the network devices (e.g., 114, 124, etc.) may provide, for example, a TLS VPN connection between the data center (110) and/or the cloud system (120). For example, the cloud module (126) may request (e.g., initiate) generation (e.g., establishment) of an end-to-end secure tunnel (e.g., a TLS VPN connection) from the cloud system (120) to the data center (110) over the network (105). Once the secure tunnel is generated: (i) the data center network device (114) may receive one or more data packets (that are intercepted by the data center module (116)), (ii) the data center network device (114) may encrypt the data packets and transmit them to the cloud network device (124) via the secure tunnel, (iii) after receiving the data packets, cloud network device (124) may decrypt the data packets and transmit them to the cloud module (126), (iv) if the data packets satisfy one or more attribution rules specified in configuration parameters (described below in reference to FIG. 2), cloud module (126) sends them to cloud infrastructure (128), and (v) data center network device (114) and cloud network device (124) may then effectively terminate the secure tunnel by managing the behavior of the secure tunnel (e.g., the TCP connection) between the data center (110) and the cloud system (120).

In one or more embodiments, the network devices (e.g., 114, 124, etc.) may include an encryption/decryption engine (not shown) providing logic, business rules, functions, or operations for handling the processing of any security related protocol (e.g., the SSL protocol, the TLS protocol, etc.) or any function related thereto. For example, the encryption/decryption engine may encrypt and/or decrypt data packets (based on executable instructions running on an encryption/decryption processor), or any portion thereof, communicated via the network devices (e.g., 114, 124, etc.). The encryption/decryption engine may also establish secure tunnel connections on behalf of the network devices (e.g., 114, 124, etc.). In one or more embodiments, the network devices (e.g., 114, 124, etc.) may also include a network optimization engine (not shown) for optimizing, accelerating, or otherwise improving the performance, operation, or quality of any network traffic (or communications) traversing the network devices.

In one or more embodiments, the network devices (e.g., 114, 124, etc.) have one or more ports (e.g., port 443, port 1521, port 8881, etc.) for transmitting and receiving data packets over a secure tunnel (or over the network (105)). The ports may provide a physical and/or logical interface between the network devices (e.g., 114, 124, etc.) and the network (105) (or another computing device for transmitting and receiving network communications). In one or more embodiments, the type and form of a port may depend on (i) the type and form of the network (105) and (ii) the type of medium for connecting to the network (105).

As used herein, a "port" is a number representing communication endpoints in computer networking. A port is an unsigned 16-bit integer (0-65535) that identifies a specific process or a network service. In most cases, a port may employ a TCP or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP may be used in combination with IP and it facilitates a transmission of datagrams from one application to another application. However, unlike the TCP, the UDP does not guarantee a reliable communication. This means that it is up to the application (that received the message) to process any errors and verify the delivery.

In one or more embodiments, the network devices (e.g., 114, 124, etc.) may be deployed based on (i) an "in-line of traffic" configuration or (ii) a "virtual in-line mode" configuration. In one or more embodiments, the network devices (e.g., 114, 124, etc.) may be deployed in-line (or in parallel) to one or more of the following: a router, a security module, a server, or another network device. Further, the network devices (e.g., 114, 124, etc.) may be deployed based on the virtual in-line mode configuration. In this configuration, a router (or a network device with routing or switching functionality) is configured to forward, re-route, or otherwise provide data packets (e.g., network packets) destined to a network device (e.g., 114, 124, etc.).

The network device (e.g., 114, 124, etc.) may then perform any desired processing on the data packets, such as any of WAN optimization techniques. Upon completion of processing, the network device (e.g., 114, 124, etc.) may forward the processed data packets to the router to transmit to the destination over the network (105). By this way, the network device (e.g., 114, 124, etc.) may be coupled to the router in parallel but still operate as it if the network device (e.g., 114, 124, etc.) were in-line. This deployment configuration may also provide transparency in the source and destination addresses, and port information are preserved as the data packets are processed and transmitted via the network device (e.g., 114, 124, etc.) through the network (105).

In one or more embodiments, the network devices (e.g., 114, 124, etc.) may be implemented using any combination of wired and/or wireless network topologies. The network devices (e.g., 114, 124, etc.) may employ any number and types of communications to enable the data center (110) and the cloud system (120) to communicate with each other.

In one or more embodiments, a network device (e.g., 114, 124, etc.) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network device described throughout this application. Alternatively, in one or more embodiments, the network device may also be implemented as a logical device.

In one or more embodiments, because the components (described above and below) of the data center (110) and/or the cloud system (120) store and manage business-critical data and applications (e.g., services), data security is one of the key aspects while designing a data center and/or cloud system. To achieve this, as an additional, active, standby, and reliable security layer, a module (e.g., 116, 126, etc.) may be deployed between (or disposed between) a firewall (e.g., 112, 122, etc.) and other components of the data center (110) and/or the cloud system (120) so that, for example, (i) each component behind the module may remain intact, and (ii) business-critical data and services and their disaster recovery mechanisms may not be directly exposed to the network (105) (because, in general, most of database applications and/or web services provided by a data center are directly exposed to a network with the protection of a single firewall layer, and in case of any attack or disaster, the data center may be vulnerable to direct attacks or impacts).

In one or more embodiments, the data center (110) and/or the cloud system (120) may include one or more modules (e.g., 116, 126, etc.) that execute independently from a firewall (e.g., 112, 122, etc.) of the corresponding data center (110) and/or cloud system (120). More specifically, one instance of a module (e.g., 116) may be deployed to each data center, for example, of an organization.

In one or more embodiments, as being a lightweight multi-site application executing in each site of an organization, the organization may easily configure, deliver, and manage each module (e.g., 116, 126, etc.) across, for example, multiple cloud environments for high availability and reliability. Further, each module (e.g., 116, 126, etc.) may provide, for example (but not limited to): global load balancing, site failover, network traffic management across an organization's multiple data centers, disaster recovery operations, and public cloud provider networks, etc. In order to provide the aforementioned functionalities, each module (e.g., 116, 126, etc.) may (i) monitor the health, availability, and latency for each site, and (ii) perform one or more disaster recovery operations detailed below.

In one or more embodiments, each module (e.g., 116, 126, etc.) may also, for example (but not limited to): ensure multi-site resiliency and disaster recovery (e.g., a module (e.g., 116, 126, etc.) may identify an issue and redirect network traffic to the disaster recovery resources or any other data center according to configuration parameters, or to healthy data centers if there is an outage), improve data center performance and availability (for example, if network traffic is not distributed appropriately across data centers, one site might become oversubscribed while another is underutilized, and with its network traffic management functionality, a module may ensure that the load is balanced more evenly across sites for an optimal user experience), improve scalability and agility of data centers, implement load balancing and reduce latency in data centers (by ensuring that no single data center is overloaded with too many valid requests), satisfy regulatory and security requirements (e.g., configuration parameters), etc.

One of ordinary skill will appreciate that a module (e.g., 116, 126, etc.) may perform other functionalities without departing from the scope of the invention. In one or more embodiments, a module (e.g., 116, 126, etc.) may be configured to perform all, or a portion, of the functionalities described in FIGS. 4.1-7. Additional details about the data center module (116) are described below in reference to FIG. 2. Additional details about the cloud module (126) are described below in reference to FIG. 3.

In one or more embodiments, a module (e.g., 116, 126, etc.) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the security module described throughout this application. Alternatively, in one or more embodiments the module may also be implemented as a logical device.

In one or more embodiments, an infrastructure (e.g., 118, 128, etc.) includes computing resources and memory resources. The memory resources may include a specialized, high-speed network that provides high-performance and low-latency network access to storage devices (e.g., a networked storage solution) such as a SAN infrastructure. In one or more embodiments, the SAN infrastructure may include, for example, one or more hosts (e.g., a SAN metadata server, a SAN data replication server, a SAN management server, etc.), one or more switches (e.g., a Fibre Channel (FC) switch, an Ethernet switch, an InfiniBand switch, etc.), one or more gateways (to move data between different SAN infrastructures), and one or more storage devices (e.g., redundant array of independent disks (RAID), a storage pool, a virtual storage resource for access by a remotely located computing device, etc.) that are interconnected using a variety of technologies, interfaces, topologies, and protocols (e.g., FC, Internet small computer systems interface (iSCSI), SCSI, nonvolatile memory express (NVMe), Fibre Connection (FICON), Fibre Channel over Ethernet (FCOE), remote direct memory access (RDMA), secure remote password (SRP), etc.).

In one or more embodiments, through different types of virtualization, the SAN infrastructure may present storage devices to a host such that the storage devices appear to be locally attached. More specifically, storage traffic over, for example, FC avoids TCP/IP packetization and latency issues, as well as any LAN congestion, ensuring the highest simultaneous access speed available for media and mission critical stored data. Further, the SAN infrastructure may be used to, for example (but not limited to): improve application (and/or data) availability (e.g., via multiple data paths, via internal fallback (e.g., hardware redundancy) mechanisms, etc.), enhance application performance (e.g., via off-load storage functions, segregate networks, etc.), increase storage utilization and effectiveness (e.g., by consolidating storage resources, providing tiered storage, etc.), etc.

In one or more embodiments, a storage device (e.g., a device to store data and provide access to stored data) of the SAN infrastructure may store unstructured and/or structured data that may include, for example (but not limited to): an identifier, an alias, a serial number, a vendor name or identifier, a model identifier, an identification of at least one capability, an identification of an available functionality, an identification of a resource provided by a storage device, a data center identifier, a storage device identifier, an access control list (ACL), a type of a data center, a size of a data center, an amount of space used in a data center, an amount of space available in a data center, information associated with redundancy features, a storage pool identifier, a parent storage pool identifier, a size of a storage pool, an amount of space used in a storage pool, an amount of space available in a storage pool, information associated with the types of provisioning functionality availability, default configuration data of a storage device, status data of a storage device, etc.

As used herein, a "switch fabric" is an interconnected network of switching devices that may include one or more input and output ports for communicating with a switch in a network of switching devices. As an interconnect architecture (e.g., a combination of hardware and software components), a switch fabric may (i) redirect data within a system (e.g., the SAN infrastructure) from one of the ports in a line card to another port in a different line card and (ii) dynamically modify ACLs to include identifications of VMs, host computing devices, and/or network ports authorized to access a storage device. Further, a switch fabric may be a heterogeneous device, including switches that communicate based on the aforementioned protocols.

In one or more embodiments, the SAN infrastructure may provide data protection (e.g., data backup, data replication, data management, data restore, etc.) services to the clients (or any other component of the system (100)). The data protection services may initiate generation and storage of backups (e.g., block-based backups, file-based backups, etc.) in the SAN infrastructure. The data protection services may also include restoration of the clients (or any other component of the system (100)) to a restoration host (not shown) using the backups stored (temporarily or permanently) in the SAN infrastructure.

More specifically, the SAN infrastructure may provide data protection services to the clients (or any other component of the system (100)) by orchestrating (or scheduling): (i) generation of backups of the clients, (ii) storage of the generated backups of the clients, (iii) consolidation of one or more backup requests to reduce (or to prevent) generation of backups that are not useful for restoration purposes, and (iv) restoration of the clients to previous states using backups stored in the SAN infrastructure. Further, to provide the aforementioned services, the SAN infrastructure may include functionality to generate and issue instructions to any other component of the system (100). The SAN infrastructure may also generate instructions in response to data protection requests from other entities.

In one or more embodiments, the SAN infrastructure may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, while performing one or more operations requested by a user (or an administrator) of the corresponding data center (110) and/or cloud system (120), the SAN infrastructure may include functionality to request and use resources (e.g., data, computing resources, etc.) available in the corresponding data center (110) and/or cloud system (120). Additional details about the resources (e.g., processing resources, networking resources, etc.) are described below. In one or more embodiments, the administrator may be a user with permission (e.g., a user that has root-level access) to make changes on the corresponding data center (110) and/or cloud system (120) that will affect other users of the corresponding data center (110) and/or cloud system (120).

In one or more embodiments, in order to provide the above-mentioned functionalities, the SAN infrastructure may need to communicate with other components of the corresponding data center (110) and/or cloud system (120) with minimum amount of latency (e.g., with high-throughput (e.g., a high data transfer rate) and sub-millisecond latency). For this reason, REST APIs may be used to enable communication(s) between the SAN infrastructure and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, a SAN infrastructure may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the SAN infrastructure described throughout this application. Alternatively, in one or more embodiments the SAN infrastructure may also be implemented as a logical device.

In one or more embodiments, a processing or computing resource of the infrastructure (e.g., 118, 128, etc.) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource of the infrastructure (e.g., 118, 128, etc.) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client. The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client).

In one or more embodiments, a networking resource of the infrastructure (e.g., 118, 128, etc.) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the client device(s) (130) with external entities (e.g., other clients, the data center (110), and the cloud system (120) and to allow for the transmission and receipt of data with those entities). A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

In one or more embodiments, a networking resource may implement and/or support the above-mentioned protocols to enable the communication between the client and external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an IP address) to be used when utilizing the above-mentioned protocols.

Further, a networking resource, when using a certain protocol or a variant thereof, may support streamlined access to storage/memory media of other clients. For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource of the infrastructure (e.g., 118, 128, etc.) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client. The VM (and applications hosted by the VM) may generate data (e.g., VM data) that is stored in the storage/memory resources of the client, in which the VM data may reflect a state of the VM. In one or more embodiments, the VM may provide services to users, and may host instances of databases, email servers, or other applications that are accessible to the users.

In one or more embodiments, a virtualization resource may include a hypervisor, in which the hypervisor may be configured to orchestrate an operation of a VM by allocating computing resources of a client to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client that when executed by processing resources of the client cause the client to provide the functionality of the hypervisor.

In one or more embodiments, the network (105) may represent a computing network configured for computing resource and/or messages exchange among registered computing hosts. As discussed above, components of the system (100) may operatively connect to one another through the network (105) (e.g., a LAN, a WAN, a mobile network, a wireless LAN (WLAN), etc.). In one or more embodiments, the network (105) may be implemented using any combination of wired and/or wireless network topologies, and the network (105) may be operably connected to the Internet or other networks. Further, the network (105) may enable interactions between the data center (110) and the cloud system (120) through any number and types of wired and/or wireless network protocols (e.g., TCP, UDP, Internet Protocol version 4 (IPv4), etc.).

In one or more embodiments, client device(s) (130) may be physical or logical computing devices configured for hosting one or more workloads and/or for providing computing environments whereon workloads may be implemented. The client device(s) (130) may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients). In one or more embodiments, the client device(s) (130) may correspond to computing devices that one or more users (discussed below) use to interact with one or more components of the system (100).

In one or more embodiments, the client device(s) (130) may include any number of applications (and/or content accessible through the applications) that provide computer-implemented application services to the users. Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide the aforementioned application services, each application may host similar or different components. The components may be, for example (but not limited to): instances of databases, instances of email servers, etc. Applications may be executed on the clients as instances of an application.

Further, applications may vary in different embodiments, but in certain embodiments, applications may be custom developed or commercial (e.g., off-the-shelf) applications that a user desires to execute in the client device(s) (130). In one or more embodiments, applications (e.g., a word processor, a media player, a web browser, a file viewer, an image editor, etc.) may be (i) designed and configured to perform one or more functions instantiated by a user and (ii)

logical entities executed using computing resources of a client. For example, applications may be implemented as computer instructions, e.g., computer code, stored on persistent storage of the client device(s) (130) that when executed by the processor(s) of the client device(s) (130) cause the client device(s) (130) to provide the functionality of the applications described throughout the application.

In one or more embodiments, while performing, for example, one or more operations requested by a user, applications installed on the client device(s) (130) may include functionality to request and use physical and/or logical components of the client device(s) (130). Applications may also include functionality to use data stored in storage/memory resources of the client device(s) (130). The applications may perform other types of functionalities not listed above without departing from the scope of the invention. In one or more embodiments, while providing application services to a user, applications may store data that may be relevant to the user in storage/memory resources of the client device(s) (130).

In one or more embodiments, the client device(s) (130) may issue requests to the data center (110) and/or cloud system (120) to receive responses and interact with various components of the data center (110) and/or cloud system (120). The client device(s) (130) may also request data from and/or send data to the data center (110) and/or cloud system (120). Further, the client device(s) (130) may initiate an application to execute on the data center (110) and/or cloud system (120) such that the application may (itself) gather, transmit, and/or otherwise manipulate data located in the data center (110) and/or cloud system (120), remote to the client device(s) (130). In one or more embodiments, the client device(s) (130) may share access to more than one data center and may similarly share any data located in those data centers.

In one or more embodiments, when the client device(s) (130) interacts with the data center (110) and/or cloud system (120), data that is relevant to the client device(s) (130) may be stored (temporarily or permanently) in the data center (110) and/or cloud system (120). For example, consider a scenario in which data center infrastructure (118) hosts a database utilized by the client device(s) (130). In this scenario, the database may be a client database associated with users of the client device(s) (130). When a new user is identified, data center infrastructure (118) may add information of the new user to the client database. By doing so, data that is relevant to the client device(s) (130) may be stored in data center infrastructure (118). This may be done because an administrator of data center infrastructure (118) may desire access to the information of the new user at some point-in-time.

As yet another example, the client device(s) (130) may execute an application that interacts with an application database hosted by the cloud system (120). When an application upgrade is available to fix a critical software issue, the cloud system (120) may identify the client device(s) (130) that requires the application upgrade. The application database may then provide the application upgrade to the client device(s) (130). By doing so, the application executed by the client device(s) (130) may be kept up-to-date. As yet another example, the client device(s) (130) may send instructions to the data center (110) to configure one or more VMs hosted by the data center (110). In one or more embodiments, instructions may be, for example (but not limited to): instructions to configure a backup policy, instructions to take a snapshot of VM data, etc. The client device(s) (130) may perform other types of functionalities not listed above without departing from the scope of the embodiments disclosed herein.

In one or more embodiments, the client device(s) (130) may provide computer-implemented services to users (and/or other computing devices such as, other client device(s) (130) or other types of devices). The client device(s) (130) may provide any number and any type of computer-implemented services (e.g., data storage services, electronic communication services, etc.). To provide computer-implemented services, each client device(s) (130) may include a collection of physical components (e.g., processing resources, storage/memory resources, networking resources, etc.) configured to perform operations of the client and/or otherwise execute a collection of logical components (e.g., applications, virtualization resources, etc.) of the client device(s) (130).

In one or more embodiments, the client device(s) (130) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout this application. Alternatively, in one or more embodiments, the client device(s) (130) may also be implemented as a logical device.

In one or more embodiments, users may interact with (or operate) the client device(s) (130) in order to perform work-related tasks (e.g., production workloads). In one or more embodiments, the accessibility of users to the client device(s) (130) may depend on a regulation set by an administrator of the client device(s) (130). To this end, each user may have a personalized user account that may, for example, grant access to certain data, applications, and computing resources of the client device(s) (130). This may be realized by implementing the "virtualization" technology (discussed above).

In one or more embodiments, for example, a user may be automatically directed to a login screen of the client device(s) (130) when the user connected to that client device(s) (130). Once the login screen of the client device(s) (130) is displayed, the user may enter credentials (e.g., username, password, etc.) of the user on the login screen. The login screen may be a graphical user interface (GUI) generated by a visualization module (not shown) of the client device(s) (130). In one or more embodiments, the visualization module may be implemented in hardware (e.g., circuitry), software, or any combination thereof.

In one or more embodiments, the GUI may be displayed on a display of a computing device (e.g., 800, FIG. 8) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information. Further, the GUI may be caused to display information, such as data center infrastructure information, as part of a disaster recovery operation, as detailed below.

Figure 2:
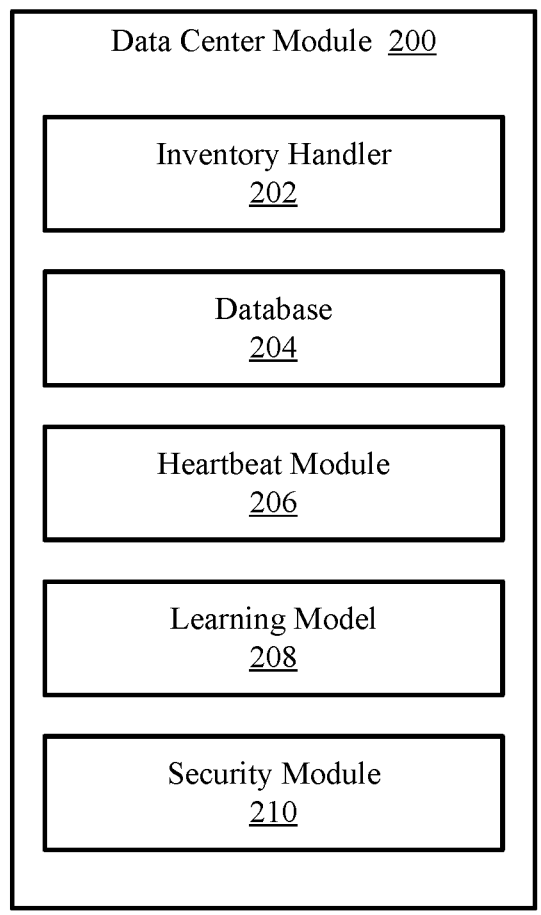
FIG. 2 shows a diagram of a data center module in accordance with one or more embodiments of the invention.

Turning now to FIG. 2, FIG. 2 shows a diagram of a data center module (200) in accordance with one or more embodiments. The data center module (200) may be an example of the data center module (e.g., 116, FIG. 1) discussed above in reference to FIG. 1. The data center module (200) may include an inventory handler (202), a database (204), a heartbeat module (206), a learning module (208), and a security module (210). The data center module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the inventory handler (202) includes functionality to, e.g., manage hardware inventory, application inventory, database/storage inventory, connectivity inventory, network inventory, power inventory, and temperature inventory. In one or more embodiments, hardware inventory includes an inventory of all hardware installed in a data center (e.g., data center (110)), including servers (which may include computing devices and any components of a computing device as described herein), storage devices, networking devices (which may include routers, switches, hubs, etc.), consoles, and any other hardware device used to process, transmit, store, or otherwise manage data. In one or more embodiments, application inventory includes an inventory of all applications operating in the data center, including virtual machine applications, web applications, database servers, lightweight direct access protocol applications, dynamic host configuration protocol applications, domain name server applications, email server hosting, domain controller applications, etc. In one or more embodiments, the database/storage inventory includes data about all of the database and storage devices and associated services in the data center, including backup information (e.g., location of backups (e.g., snapshots), number of backups, resources allocated to backup operations, types of backups (e.g., virtual machine snapshots, hardware snapshots, SAN snapshots, etc.), backup schedules, etc.). In one or more embodiments, the connectivity inventory includes data about all of the interconnectivity of all of the devices, including an inventory of which devices are connected to which, the locations of all of the devices, which ports are used to connect each device, etc. In one or more embodiments, network inventory includes data about all of the networking devices including configuration settings, devices connected to each networking device, etc. In one or more embodiments, the power inventory includes an inventory of each power device (e.g., generators, batteries, wiring, fuses, breakers, and any other device used in the process of providing or storing power), configuration details of each power device, etc. In one or more embodiments, the temperature inventory includes an inventory of temperature control devices (e.g., heating, air, ventilation, and cooling devices, fans, filters, air conditioning devices, etc.), configuration details for each temperature control device, etc. A collection of some or all of the above data may be included in an infrastructure file and may be referred to as data center information.

In one or more embodiments, the inventory handler (202) also includes functionality to perform different operations. In one or more embodiments, the inventory handler (202) creates backups, collects any portion, including all of, the data described above, creates logs of applications, clears logs periodically (e.g., based on size and/or time), identifies priority levels of devices and/or applications with a defined set of policies, identifies a health level of devices with a defined set of policies and from collecting data over time from the devices, performs input/output and bandwidth analysis of some or all devices, collects performance analysis of some or all devices, generates failure predictions of some or all devices, identifies resources needed for each application, generates predictions of resources needed for each application, generates an order of operations to initiate a disaster recovery operation, collects performance data for data center infrastructure, virtual machines, applications, etc.

In one or more embodiments, the database (204) stores all data related the security module (210) rules, application data, backups, details of active and standby web or application servers in the data center, details of different types of data center hardware and connectivity, a schedule for uploading different files (including infrastructure files, backups, etc.), user access and communication details for exchanges within a cloud module (e.g., 126), details of successful and failed communications with the cloud module, details of requested rejected by the security module, default and updated policies for identification and classification of devices in the data center, details of all applications in the data center, schedule and transmission of predictions to the cloud module, failure predictions for different devices, etc.

In one or more embodiments, the heartbeat module (206) includes functionality to send periodic calls to the cloud module. For example, the heartbeat module (206) sends signals to the cloud module on a pre-defined schedule (e.g., every minute) to indicate to the cloud module that the data center is operating under normal conditions. In one or more embodiments, the heartbeat module (206) also includes functionality to check the operations of the data center. In one or more embodiments, a failure to send a heartbeat signal by the heartbeat module (206) is indicative that the data center is unavailable and that disaster recovery operations should be initiated.

In one or more embodiments, the learning model (208) includes functionality to generate predictions of resources and/or a list of assigned disaster recovery resources. The learning model (208) may include AI/ML techniques to receive data and generate outputs. For example, the learning model may include supervised learning models, unsupervised learning models, reinforcement learning models, or any other learning model. The functionality of the learning model is described in further detail with respect to FIG. 6.

In one or more embodiments, the security module (210) includes functionality to, e.g.: (i) intercept, identify, and accept/reject a request/call/network traffic (e.g., a data continuity request) received from an entity (e.g., a SAN infrastructure using an interception mechanism, (ii) provide an additional layer of security/authentication mechanism (on top of a firewall) during any type communication/transaction/operation (e.g., a disaster recovery operation) (a) for maximum data security, integrity, and availability, and (b) to prevent initiation of any invalid/bogus data continuity/retrieval operation, (iii) obtain (or receive) an encrypted secure string-appended request and send that request to the corresponding target (e.g., the cloud module over a network (e.g., 105, FIG. 1), (iv) based on (iii), send the encrypted secure string-appended request and its corresponding details (e.g., an IP address of a targeted destination and/or a port address of a target component (e.g., storage in a SAN infrastructure), a client-side configuration associated with the request, information regarding data (e.g., type and/or content of data that is planned to be accessed, a device/domain/unique identifier (IP address) of a user that wants to access that data, etc.), etc.), (v) intercept and identify a request/call (e.g., an encrypted secure string-appended request, a DNS request, an Internet control message protocol (ICMP) request, a network access request to initiate a hacking attack, a data access request, etc.) received from an entity (e.g., another analyzer of another security module (which is a valid/trusted entity), a compromised user, an invalid user, a malicious insider, a credential/data thief, a negligent insider, etc.) based on a security protocol set by the related organization, (vi) based on (v) and the corresponding details of the request, make a determination that the request is valid or not, (vii) based on the determination performed in (vi), reject the invalid request and send the rejected request (including its corresponding details) to the database (204), (viii) based on the determination performed in (vi), accept the valid request and initiate generation of a secure data continuity path (e.g., a secure/encrypted, point-to-point tunnel) (described above in reference to FIG. 1) across (or overlay on) a network (e.g., 105, FIG. 1), (ix) based on the determination performed in (vi), initiate an operation (e.g., a data continuity operation) that is defined in the intercepted request (described in (v)) by notifying the valid sender (i.e., the valid entity described in (v)) of that request, (x) in response to receiving a notification from another analyzer, send (or forward) the notification to a component of the corresponding data center, (xi) receive outgoing network traffic (e.g., data packets or other communication protocol compliant data structures that are being replicated) from the component (described in (x)) that is planned to be transmitted via the secure data path (described in (viii)), (xii) based on (xi), verify (and filter some of the outgoing network traffic if necessary) that the outgoing network traffic satisfies one or more attribution rules specified in the configuration parameters (e.g., verify the validity of the outgoing network traffic), (xiii) based on the verification performed in (xii), initiate transmission of the outgoing network traffic to the target (e.g., the cloud system) using the secure data path, (xiv) send the details of the transmission operation to the database (204), (xv) notify an administrator of the corresponding cloud system about the initiation of the secure, tamper-free, and efficient transmission operation (e.g., the data continuity operation) using the corresponding data center's GUI (or using a visualization module (not shown) of the data center module (200)), and (xvi) as part of data management services provided by the corresponding data center, provide a secure method for storing and accessing data managed by the corresponding data center.

As used herein, a "malicious insider" is a user who intentionally hurts the organization, whether through data theft or by sabotage.

As used herein, a "negligent insider" is a user who unintentionally puts the organization's security at risk.

As used herein, a "credential/data thief" is an outside infiltrator who enters the organization through, for example, an employee account.

In one or more embodiments, as mentioned above, the security module (210) (*i*) may operate as a reverse proxy (e.g., a unidirectional proxy, a reverse proxy agent, an interceptor, etc.) (or may be configured to operate in a reverse proxy mode) to intercept and scrutinize all incoming requests/calls/network traffic from the network (e.g., 105, FIG. 1) (that are allowed or not allowed (but bypassed) a corresponding firewall (e.g., 112, 122, etc., FIG. 1) (as the first layer of security)) towards the corresponding infrastructure (e.g., 118, 128, etc., FIG. 1) to prevent any malicious attacks (e.g., hacking/data hijacking attacks, DDOS attacks, etc.), and (ii) may operate in various different OS architectures based on OS wrapper packaging (e.g., Linux®,  Docker®, Microsoft® Windows, etc.), or in any embedded OS, any network OS, any real-time OS, any open source OS, any OS for mobile computing devices, etc. As being a reverse proxy and an additional layer of security, the security module (210) may also monitor all the outgoing responses/calls/network traffic and notify the database (204) to log their details. To enable these (and the aforementioned) functionalities of the security module (210), the data center module (200) may be deployed in-line and between a firewall (e.g., 112, 122, etc., FIG. 1) and other components of a corresponding data center (e.g., 110, 120, etc., FIG. 1). As described above, the data center module (200) may not be in-line at all times, but may become in-line upon certain triggers In this manner, for example, (i) all network traffic may pass through the data center module (200) before arriving at a destination within a corresponding data center (e.g., the security module (210) may manage all incoming requests from a client device, and direct the valid requests to one or more services provided by the corresponding data center), (ii) the security module (210) may forward, re-route, load-balance, or otherwise provide the received network communication (e.g., data packets) to a corresponding infrastructure (e.g., 118, 128, etc., FIG. 1), (iii) the security module (210) may block an invalid request/call/network traffic, and (iv) the security module (210) may filter (e.g., drop) some of the outgoing network traffic (i.e., data packets or other communication protocol compliant data structures) that is planned to be transmitted via a secure data path.

As used herein, a "reverse proxy" protects components (e.g., web servers) of a computing device (e.g., a data center) from various different attacks and typically be implemented to increase security, performance, and reliability of that computing device. In most cases, as being an application-level gateway, a reverse proxy may sit in front of a data center and intercept one or more requests sent by a client over a network. If the requests are valid, the reverse proxy may forward them to a corresponding component of the data center for processing, and may then intercept the responses for those requests before initiating the transmission of those responses to the client. In this manner, no client ever communicates directly with the components of the data center.

A reverse proxy may provide one or more functionalities, for example (but not limited to): disaster recovery operations (described below), protection from attacks (e.g., with a reverse proxy in place, a service never needs to reveal the IP address of its server, which makes harder to perform a DDOS attack), global server load balancing, caching (e.g., for faster data center performance, a reverse proxy may cache (temporarily save) response data), encryption (e.g., a reverse proxy may be configured to decrypt all incoming requests and encrypt all outgoing responses, in order to free up some of the resources of a data center), etc.

In one or more embodiments, the data center module (200) may also include a visualization module. The visualization module may include functionality to, e.g.: (i) receive one or more details of a disaster recovery operation, and display the aforementioned content on its GUI (for example, to an administrator of the corresponding data center), (ii) receive one or more details (described above) of an incoming request/call/network traffic, and display the aforementioned content on its GUI (for example, in a separate window(s) on its GUI), and (iii) receive one or more details (described above) of an outgoing request/call/network traffic, and display the aforementioned content on its GUI (for example, in a separate window(s) on its GUI). In one or more embodiments, the visualization module may concurrently display one or more separate windows on its GUI.

In one or more embodiments, for example, while displaying an incoming request/call/network traffic and/or an outgoing request/call/network traffic, the visualization module may represent: (i) a normal (e.g., a valid) incoming request/call/network traffic with green color tones and (ii) an abnormal (e.g., an invalid) incoming request/call/network traffic with red color tones.

One of ordinary skill will appreciate that the visualization module may perform other functionalities without departing from the scope of the invention. The visualization module may be implemented using hardware, software, or any combination thereof.

In one or more embodiments, the inventory handler (202), the database (204), the heartbeat module (206), the learning model (208), and the security module (210), and visualization module may be utilized in isolation and/or in combination to provide the above-discussed functionalities. These functionalities may be invoked using any communication model including, for example, message passing, state sharing, memory sharing, etc. By doing so, the data center module (200) may address issues related to data security, integrity, and availability proactively.

Figure 3:
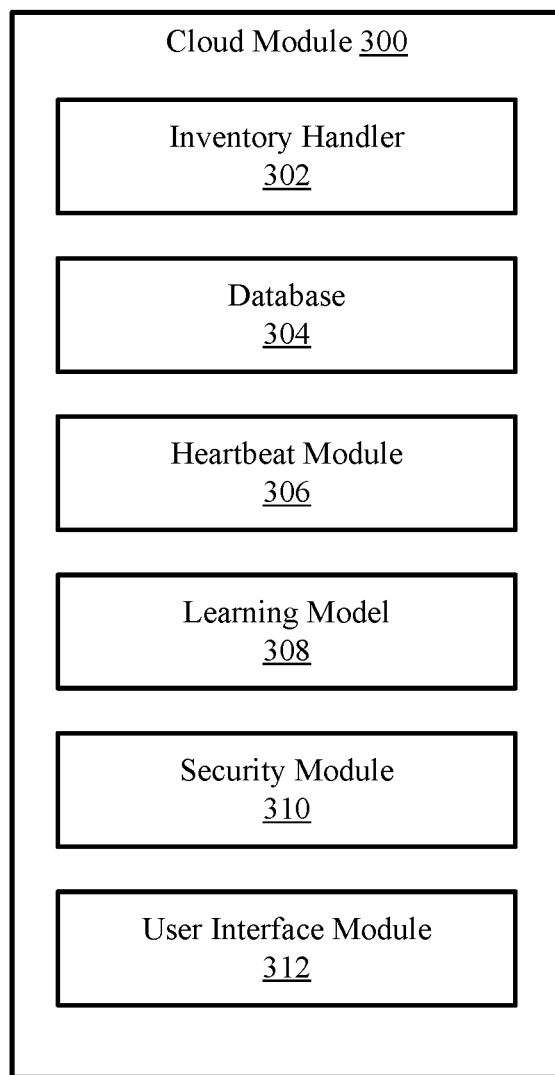
FIG. 3 shows a diagram of a cloud module in accordance with one or more embodiments of the invention.

Turning now to FIG. 3, FIG. 3 shows a diagram of a cloud module (300) in accordance with one or more embodiments. The cloud module (300) may be an example of the cloud module (e.g., 126) discussed above in reference to FIG. 1. The cloud module (300) may include an inventory handler (302), a database (304), a heartbeat module (306). a learning module (308), a security module (310), and a user interface module (312). The cloud module (300) may include additional, fewer, and/or different components without departing from the scope of the invention. In one or more embodiments, the cloud module (300) may be distributed across various geographic locations. In one or more embodiments, the cloud module (300) is connected to multiple data center modules and provides the following services for multiple data center modules. Each component may be operably connected to any of the other component via any combination of wired and/or wireless connections. Each component illustrated in FIG. 3 is discussed below.

In one or more embodiments, the inventory handler (302) includes functionality to accept data from the data center module, including e.g., manage hardware inventory, application inventory, database/storage inventory, connectivity inventory, network inventory, power inventory, and temperature inventory, some or all of which may be included in an infrastructure file and may be referred to as data center information. The inventory handler (302) also accepts backup data from the data center module, maintains the above data and keeps the data in a ready-to-download mode to rapidly deploy the data in a disaster recovery operation, takes steps (described below) to optimize disaster recovery resources to handle loads, deploys backups to SAN replication sites, establishes communication with SAN replication sites, generates status reports of applications during a disaster recovery operation, generates, collects, and uploads backups during a disaster recovery operation, performs end of disaster recovery operations, assign disaster recovery resources based on data received from the data center module, add or remove virtual machine network interface cards and/or virtual machine kernels to and from hosts, add or remove virtual machines vDisks, data stores, computing resources, networking resources, storage resources, and other resources to disaster recovery resources, deploy and discard backups, and establish multipath communications with SAN replication sites.

In one or more embodiments, the database (304) stores all data related the security module (310) rules, application data, backups, details of active and standby web or application servers managed by the data center, details of different types of data center hardware and connectivity, a schedule for uploading different files (including infrastructure files, backups, etc.), a catalog of information on different types of uploads, user interface permission policies, user access and communication details for exchanges within a data center module (e.g., 116), details of successful and failed communications with the data center module, details of requested rejected by the security module (310), default and updated policies for identification and classification of devices in the data center, details of all applications in the data center and the cloud system, schedule and transmission of communications with the data center module, failure predictions for different devices, performance analysis and predictions for systems containing data from the applications and the mapped systems in the cloud system, action lists to initiate a disaster recovery operation provided by the data center module, etc.

In one or more embodiments, the heartbeat module (306) includes functionality to receive periodic calls from the data center module. For example, the heartbeat module (306) receives signals to the cloud module on a pre-defined schedule (e.g., every minute) to indicate to the cloud module that the data center is operating under normal conditions. In one or more embodiments, a failure to receive a schedule heartbeat signal by the heartbeat module (306) is indicative that the data center is unavailable and that disaster recovery operations should be initiated. Further, the heartbeat module (306) may send notifications to the disaster recovery resources to initiate and/or end a disaster recovery operation.

In one or more embodiments, the learning model (308) includes functionality to generate predictions of resources and/or a list of assigned disaster recovery resources. The learning model (308) may include AI/ML techniques to receive data and generate outputs. For example, the learning model may include supervised learning models, unsupervised learning models, reinforcement learning models, or any other learning model. The functionality of the learning model is described in further detail with respect to FIG. 6.

In one or more embodiments, the security module (310) includes functionality to, e.g.: (i) intercept, identify, and accept/reject a request/call/network traffic (e.g., a data continuity request) received from an entity (e.g., a SAN infrastructure using an interception mechanism), (ii) provide an additional layer of security/authentication mechanism (on top of a firewall) during any type communication/transaction/operation (e.g., a disaster recovery operation) (a) for maximum data security, integrity, and availability, and (b) to prevent initiation of any invalid/bogus disaster recovery operation, (iii) obtain (or receive) an encrypted secure string-appended request and send that request to the corresponding target (e.g., the data center module over a network (e.g., 105, FIG. 1), (iv) based on (iii), send the encrypted secure string-appended request and its corresponding details (e.g., an IP address of a targeted destination and/or a port address of a target component (e.g., storage in a SAN infrastructure), a client-side configuration associated with the request, information regarding data (e.g., type and/or content of data that is planned to be accessed, a device/domain/unique identifier (IP address) of a user that wants to access that data, etc.), etc.), (v) intercept and identify a request/call (e.g., an encrypted secure string-appended request, a DNS request, an Internet control message protocol (ICMP) request, a network access request to initiate a hacking attack, a data access request, etc.) received from an entity (e.g., another analyzer of another security module (which is a valid/trusted entity), a compromised user, an invalid user, a malicious insider, a credential/data thief, a negligent insider, etc.) based on a security protocol set by the related organization, (vi) based on (v) and the corresponding details of the request, make a determination that the request is valid or not, (vii) based on the determination performed in (vi), reject the invalid request and send the rejected request (including its corresponding details) to the database (304), (viii) based on the determination performed in (vi), accept the valid request and initiate generation of a secure data continuity path (e.g., a secure/encrypted, point-to-point tunnel) (described above in reference to FIG. 1) across (or overlay on) a network (e.g., 105, FIG. 1), (ix) based on the determination performed in (vi), initiate an operation (e.g., a data continuity operation) that is defined in the intercepted request (described in (v)) by notifying the valid sender (i.e., the valid entity described in (v)) of that request, (x) in response to receiving a notification from another analyzer, send (or forward) the notification to a component of the corresponding data center, (xi) receive outgoing network traffic (e.g., data packets or other communication protocol compliant data structures that are being replicated) from the component (described in (x)) that is planned to be transmitted via the secure data path (described in (viii)), (xii) based on (xi), verify (and filter some of the outgoing network traffic if necessary) that the outgoing network traffic satisfies one or more attribution rules specified in the configuration parameters (e.g., verify the validity of the outgoing network traffic), (xiii) based on the verification performed in (xii), initiate transmission of the outgoing network traffic to the target (e.g., the data center) using the secure data path, (xiv) send the details of the transmission operation to the database (304), (xv) notify an administrator of the corresponding cloud system about the initiation of the secure, tamper-free, and efficient transmission operation (e.g., the disaster recovery operation) using the corresponding data center's GUI (or using a user interface module (312) of the cloud module (300)), and (xvi) as part of data management services provided by the corresponding cloud system, provide a secure method for storing and accessing data managed by the corresponding cloud system.

In one or more embodiments, as mentioned above, the security module (310) (*i*) may operate as a reverse proxy (e.g., a unidirectional proxy, a reverse proxy agent, an interceptor, etc.) (or may be configured to operate in a reverse proxy mode) to intercept and scrutinize all incoming requests/calls/network traffic from the network (e.g., 105, FIG. 1) (that are allowed or not allowed (but bypassed) a corresponding firewall (e.g., 112, 122, etc., FIG. 1) (as the first layer of security)) towards the corresponding infrastructure (e.g., 118, 128, etc., FIG. 1) to prevent any malicious attacks (e.g., hacking/data hijacking attacks, DDOS attacks, etc.), and (ii) may operate in various different OS architectures based on OS wrapper packaging (e.g., Linux®, Docker®, Microsoft® Windows, etc.), or in any embedded OS, any network OS, any real-time OS, any open source OS, any OS for mobile computing devices, etc. As being a reverse proxy and an additional layer of security, the security module (310) may also monitor all the outgoing responses/calls/network traffic and notify the database (304) to log their details. To enable these (and the aforementioned) functionalities of the security module (310), the cloud module (300) may be deployed in-line and between a firewall (e.g., 112, 122, etc., FIG. 1) and other components of a corresponding data center (e.g., 110, 120, etc., FIG. 1). As described above, the cloud module (300) may not be in-line at all times, but may become in-line upon certain triggers In this manner, for example, (i) all network traffic may pass through the cloud module (300) before arriving at a destination within a corresponding cloud system (e.g., the security module (310) may manage all incoming requests from a client device, and direct the valid requests to one or more services provided by the corresponding cloud system), (ii) the security module (310) may forward, re-route, load-balance, or otherwise provide the received network communication (e.g., data packets) to a corresponding infrastructure (e.g., 118, 128, etc., FIG. 1), (iii) the security module (310) may block an invalid request/call/network traffic, and (iv) the security module (310) may filter (e.g., drop) some of the outgoing network traffic (i.e., data packets or other communication protocol compliant data structures) that is planned to be transmitted via a secure data path.

A reverse proxy may provide one or more functionalities, for example (but not limited to): disaster recovery operations (described below), protection from attacks (e.g., with a reverse proxy in place, a service never needs to reveal the IP address of its server, which makes harder to perform a DDOS attack), global server load balancing, caching (e.g., for faster data center performance, a reverse proxy may cache (temporarily save) response data), encryption (e.g., a reverse proxy may be configured to decrypt all incoming requests and encrypt all outgoing responses, in order to free up some of the resources of a data center), etc.

In one or more embodiments, the security module (310) also includes functionality to support multiple uploads in parallel and act as a staging area in a storage infrastructure to process (e.g., provide additional security checks on data, etc.) before storing the data.

In one or more embodiments, the user interface module (312) includes functionality to, e.g.: (i) receive one or more details of a disaster recovery operation, and display the aforementioned content on its GUI (for example, to an administrator of the corresponding data center), (ii) receive one or more details (described above) of an incoming request/call/network traffic, and display the aforementioned content on its GUI (for example, in a separate window(s) on its GUI), and (iii) receive one or more details (described above) of an outgoing request/call/network traffic, and display the aforementioned content on its GUI (for example, in a separate window(s) on its GUI). In one or more embodiments, the visualization module may concurrently display one or more separate windows on its GUI.

In one or more embodiments, for example, while displaying an incoming request/call/network traffic and/or an outgoing request/call/network traffic, the visualization module may represent: (i) a normal (e.g., a valid) incoming request/call/network traffic with green color tones and (ii) an abnormal (e.g., an invalid) incoming request/call/network traffic with red color tones.

One of ordinary skill will appreciate that the visualization module may perform other functionalities without departing from the scope of the invention. The visualization module may be implemented using hardware, software, or any combination thereof.

In one or more embodiments, the inventory handler (302), the database (304), the heartbeat module (306), the learning model (308), and the security module (310), and user interface module (312) may be utilized in isolation and/or in combination to provide the above-discussed functionalities.

These functionalities may be invoked using any communication model including, for example, message passing, state sharing, memory sharing, etc. By doing so, the cloud module (300) may address issues related to data security, integrity, and availability proactively.

FIGS. 4.1-4.2 show a method generally for establishing planning for and preparing systems for disaster recovery operations. For example, when a data center becomes unavailable for any reason, other systems may step in the place of the unavailable data center to provide some or all of the functionality of the unavailable data center. In doing so, a disaster recovery operation can very quickly and efficiently be initiated such that the lapse in services provided by the unavailable data center is minimized and/or eliminated. Further, planning ahead of a data center becoming unavailable enables the disaster recovery operations to: more efficiently utilize disaster recovery resources, be proactive rather than reactive, and enable disaster recovery to be provided as a service, thereby eliminating the need for redundant hardware that is used only when a data center becomes unavailable.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable continued servicing of requests sent from client devices when a data center is experiencing a failure or is otherwise unable to process requests.

Turning now to FIG. 4.1, the method shown in FIG. 4.1 may be executed by, for example, the above-discussed data center module (e.g., 200, FIG. 2). Other components of the system (100) illustrated in FIG. 1 may also execute all or part of the method shown in FIG. 4.1 without departing from the scope of the invention.

In Step 400, the data center module determines a priority level of each application operating in an associated data center (e.g., 110, FIG. 1). The priority level may be based on a user-defined set of policies, or based on an analysis. In one or more embodiments, the user-defined set of policies may explicitly list the priority level of some or all of the applications. In one or more embodiments, the analysis may include determining the resource usage of each application and determining the priority level based on the resource usage of each application. For example, applications with a higher resource usage may be determined to have a higher priority level. In one or more embodiments, the analysis may include determining the priority level based on the type of operation performed by each application.

In Step 402, the data center module determines a health status of data center infrastructure (e.g., 118, FIG. 1). In one or more embodiments, the health status is an indication of the useful service life remaining for an associated device and/or a failure prediction for an associated device. Further, the health status may indicate that a device is no longer functioning and in need of repair or replacement. In one or more embodiments, the determination is based on the age of the associated device, performance data of the associated device, user-defined policies, or the availability of newer hardware.

In Step 404, the data center module determines performance metrics of the data center. In one or more embodiments, the performance metrics are based on: data from sensors (e.g., temperature sensors, memory device sensors, network device sensors, humidity sensors, etc.), simple network management protocol traps, network traffic, application logs (which may also depend on the priority level of the associated application), operating system logs, data center resource utilization, resource utilization of each application, resource utilization parameters of applications and/or devices, number of transactions along with the timing of each transaction (which may enable the data center module to build a history of transactions), and/or throughput of input/output and network devices.

In Step 406, the data center module generates infrastructure files. The infrastructure files may include the data described above. In one or more embodiments, the infrastructure files each include power information, temperature information, hardware information, SAN information, network information, connectivity information, and/or application information. Further, the data in the infrastructure files may be generally referred to as data center infrastructure information. In one or more embodiments, the infrastructure files include information sufficient to enable a user to rebuild and reconfigure the associated data center. As such, in case a data center is destroyed, a user may refer to different portions of the infrastructure file to quickly and efficiently rebuild the data center, or destroyed portions of the data center and with lower risk of errors.

In Step 408, the data center module generates a prediction of disaster recovery resources based at least in part on the priority level of each application and the performance metrics. In one or more embodiments, applications below a threshold may be ignored for the prediction, meaning certain unimportant applications may not be utilized in a disaster recovery operation. In one or more embodiments, applications below a threshold are provided a reduced amount of resources for the predictions, meaning that certain applications may be throttled during a disaster recovery operation. In one or more embodiments, applications above a threshold value are provided the full amount of resources used during normal operations for the predictions. Further, basing the prediction on, at least in part, the performance metrics may enable a cloud module to assign an appropriate amount of resources when accounting for the use of different devices and combinations of devices to provide resources for use by applications. In one or more embodiments, the prediction is generated using the learning model in the data center module. More information regarding the use of the learning model to generate the prediction is discussed in reference to FIG. 6. In one or more embodiments, Step 408 is performed by the cloud module in addition to or instead of by the data center module.

In Step 410, the data center module collects generated snapshots. During the normal operation of the data center, snapshots may be generated during backup operations to preserve data. The data center module collects the snapshots generated during these normal backup operations, and may also collect policy information relating to the backup operations, including backup information (e.g., location of backups (e.g., snapshots), number of backups, resources allocated to backup operations, types of backups (e.g., virtual machine snapshots, hardware snapshots, SAN snapshots, etc.), backup schedules, etc.).

In Step 412, the data center module collects application information for applications operating on the data center. In one or more embodiments, the data center module may collect only application information for a portion of all of the applications. For example, the portion may be the portion of applications that have a priority level above a threshold value. The application information may refer to the previously discussed application inventory. In one or more embodiments, the application information includes data used by the associated application, configuration settings of the associated application, version number of the associated application, or any other information relating to the state and/or use of the application.

In Step 414, the data center module sends the prediction of disaster recovery resources, the collected snapshots, application information, and the infrastructure files to the cloud module. In embodiments in which the cloud module performs Step 408 instead of the data center module, the data center module does not sent the predictions to the cloud module. In one or more embodiments, the data center module also sends the priority levels, health status, and performance metrics to the cloud module.

The method may end following Step 414.

In addition, portions of or all of the method described in FIG. 4.1 may be repeated periodically (e.g., according to a schedule) to keep the cloud module updated on the normal operations and requirements for normal operations of the data center.

Turning now to FIG. 4.2, the method shown in FIG. 4.2 may be executed by, for example, the above-discussed cloud module (e.g., 300, FIG. 3). Other components of the system (100) illustrated in FIG. 1 may also execute all or part of the method shown in FIG. 4.2 without departing from the scope of the invention.

In Step 416, the cloud module receives a first prediction of resources, a first collected snapshot, and a first infrastructure file from the data center module. In one or more embodiments, the cloud module generates the first prediction of resources on its own and thus does not receive the first prediction of resources. In one or more embodiments, the cloud module also receives the priority levels, health status, and performance metrics from the data center module.

In Step 418, the cloud module assigns disaster recovery resources based on the first prediction of resources. In one or more embodiments, the assignment of resources is a reservation of resources located in the cloud system. In one or more embodiments, the assignment of resources is assigning resources at one or more other data centers for use in a disaster recovery operation. In one or more embodiments, the assignment of resources is a combination of reserving resources located in the cloud system and resources at one or more other data centers. Further, a single resource may be assigned to multiple data centers. In one or more embodiments, the assignment of resources of performed by the learning model and is discussed in further detail in reference to FIG. 6.

In Step 420, the cloud module receives a second prediction of resources, a second collected snapshot, and second infrastructure file from the data center module. In one or more embodiments, the cloud module generates the second prediction of resources on its own and thus does not receive the second prediction of resources. In one or more embodiments, the cloud module also receives the priority levels, health status, and performance metrics from the data center module.

In Step 422, the cloud module updates assigned disaster recovery resources based on the second prediction of resources. The update may be based on the differences between the first prediction and the second prediction, rather than considering the entirety of the second prediction. In one or more embodiments, the assignment of resources is a reservation of resources located in the cloud system. In one or more embodiments, the assignment of resources is assigning resources at one or more other data centers for use in a disaster recovery operation. In one or more embodiments, the assignment of resources is a combination of reserving resources located in the cloud system and resources at one or more other data centers. Further, a single resource may be assigned to multiple data centers. In one or more embodiments, the assignment of resources of performed by the learning model and is discussed in further detail in reference to FIG. 6.

Further, by updating receiving the predictions, snapshots, and infrastructure files periodically, the cloud module may be kept apprised of changes to the data center to enhance the ability of disaster recovery operations to perform similarly to the data center in the event that the data center becomes unavailable. Further, the steps described in FIGS. 4.1 and 4.2 may enable other disaster recovery operations as described in detail below.

The method may end following Step 422.

Figure 5:
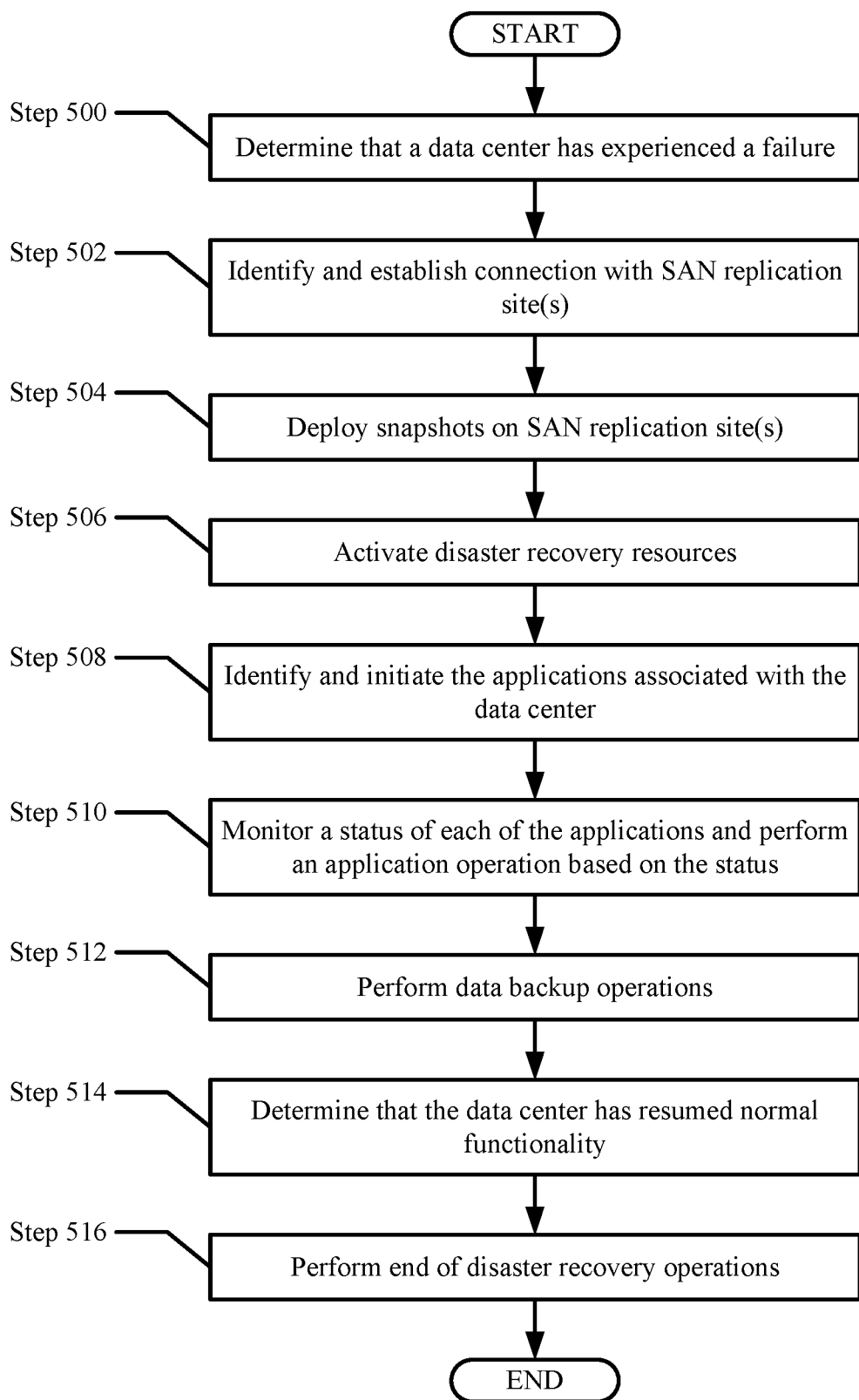
FIG. 5 shows a method in accordance with one or more embodiments of the invention.

FIG. 5 shows a method generally for providing disaster recovery operations in the event that a data center becomes unavailable. For example, when a data center becomes unavailable for any reason, the cloud system may step in to provide some or all of the functionality of the unavailable data center. In doing so, the lapse in services provided by the unavailable data center is minimized and/or eliminated. Further, the cloud system may provide the disaster recovery operations as a service, thereby eliminating the need for redundant hardware that is used only when a data center becomes unavailable, thereby reducing costs of maintaining redundant systems and the carbon footprint associated with constructing and maintaining the redundant systems.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable continued servicing of requests sent from client devices when a data center is experiencing a failure or is otherwise unable to process requests.

Turning now to FIG. 5, the method shown in FIG. 5 may be executed by, for example, the above-discussed cloud module (e.g., 300, FIG. 3). Other components of the system (100) illustrated in FIG. 1 may also execute all or part of the method shown in FIG. 5 without departing from the scope of the invention.

In Step 500, the cloud module determines that a data center has experienced a failure. The failure indicates that the data center is unavailable and that the cloud module should initiate disaster recovery operations. In one or more embodiments, the determination is based on expecting to receive a heartbeat signal and not receiving one. Further, Steps 502 through 508 may be based on the determination in Step 500.

In Step 502, the cloud module identifies and establishes connection(s) with SAN replication site(s). In one or more embodiments, the SAN replication sites are identified before the determination in Step 500. For example, the SAN replication site may be an assigned disaster recovery resource (e.g., in Steps 418 and/or 422) to the data center. In one or more embodiments, the SAN replication sites are identified after the determination and the identification is based on one or more available computing resources and/or networking resources of the SAN replication sites. Further, the SAN replication sites may be located in the cloud system, one or more other data centers, or a combination of in the cloud system and one or more other data centers. Further, the cloud module may establish multiple data paths with each SAN replication site, and each path may be performed using the reverse proxy described above.

In Step 504, the cloud module deploys one or more snapshots on the SAN replication site(s). The snapshots may first be identified as being associated with the data center experiencing a failure. The snapshots may be the most recently received snapshots from the data center before the determination made in Step 500, such that deployment of the snapshots minimizes the data lost between the time that the data center experiences a failure and the time that the disaster recovery operations are initiated. In one or more embodiments, the cloud module downloads the snapshots and deploys them on the SAN replication sites identified in Step 502, thereby enabling the SAN replication sites to provide data in place of the data center.

In Step 506, the cloud module activates the disaster recovery resources by sending an activation signal to the disaster recovery resources. The activated disaster recovery resources may be the same as those assigned in Steps 418 and 422. Further, activation of the disaster recovery resources may cause the disaster recovery resources to switch from a standby mode to an active mode. Further, as described above, the disaster recovery resources may include any resources described herein, including computing resources, networking resources, etc.

In Step 508, the cloud module identifies and initiates applications associated with the data center. The identification of applications may be based on application information sent by the data center module (e.g., in Step 414) before the determination in Step 500 is made. In one or more embodiments, the applications are initiated in an order based on the priority level of each application with applications having a higher priority level being initiated before applications having a lower priority level. Further, only a portion of the applications may be initiated, which may be based on the available disaster recovery resources, the priority level of each application, resource consumption of each application, etc. Further, the initiated applications may use one or more of the snapshots deployed in Step 504 and/or at least a portion of the disaster recovery resources activated in Step 506. Further, initiating the applications may also include reserving a portion of the activated disaster recovery resources to each application. For example, even if an application is only consuming a first level of resources, it may be anticipated that the application may consume a second level of resources, which is higher than the first level of resources. In such an embodiment, the application may be allocated an amount of resources higher than the first level.

In Step 510, the cloud module monitors a status of each of the applications and perform an application operation based on the status. In one or more embodiments, the status include resource consumption information, a health status of the application, etc. In addition, the application operation may include generating a status report that includes the status information which may be used for analysis purposes.

Further, the application operation may include determining that the portion of disaster recovery resources allocated to a particular application is improper based on: the application consuming more or less resources than predicted or a schedule for resources allocated to an application changing. In one or more embodiments, the cloud module then adjusts the portion of activated disaster resources allocated to the application. For example, the cloud module may allocate more or less resources to the application. In one or more embodiments, the adjusting of the allocation of disaster recovery resources include increasing the amount of one resource and decreasing the amount of another resource.

Monitoring the applications in Step 510 enhances the ability of the cloud module to provide disaster recovery operations with fewer or no interruptions in the services provided by the applications and may enable the applications to run more efficiently and/or enable additional applications to run on the same amount of resources by more effectively using the resources that are available.

In Step 512, the cloud module performs a data backup operation. In one or more embodiments, the data backup operation includes backing up data generated by the applications initiated in Step 508 and includes data generated after the determination in Step 500 to generate snapshots. Further, the data backup operations may be performed according to a backup schedule and other backup policies, which may be received from the data center module. Alternatively, the cloud module may utilize a different backup schedule and other backup policies from those used by the data center. For example, a user may define a disaster recovery set of backup policies. Performing the data backup operations during the pendency of the disaster recovery operations enable the cloud module to preserve data generated after the determination in Step 500 and before the data center has resumed normal operations. In one or more embodiments, the cloud module may delete snapshots generated in this Step 512 from time-to-time based on a snapshot deletion policy.

In Step 514, the cloud module determines that the data center has resumed normal functionality. In one or more embodiments, the determination is based on receiving a heartbeat signal from the data center.

In Step 516, based on the determination in Step 514, the cloud module performs end of disaster recovery operations. In one or more embodiments, the end of disaster recovery operations include stopping the applications initiated in Step 508, sending standby signals to the disaster recovery resources, sending snapshots generated in Step 512 to the data center module, and clearing configurations and/or files used and/or generated in the disaster recovery operations. In one or more embodiments, the cloud module may keep a copy of one or more of the snapshots to ensure data continuity in case the data center becomes unavailable again. In one or more embodiments, the end of disaster recovery operations causes the cloud module to return to a state it was in prior to the determination in Step 500.

The method may end following Step 516.

Figure 6:
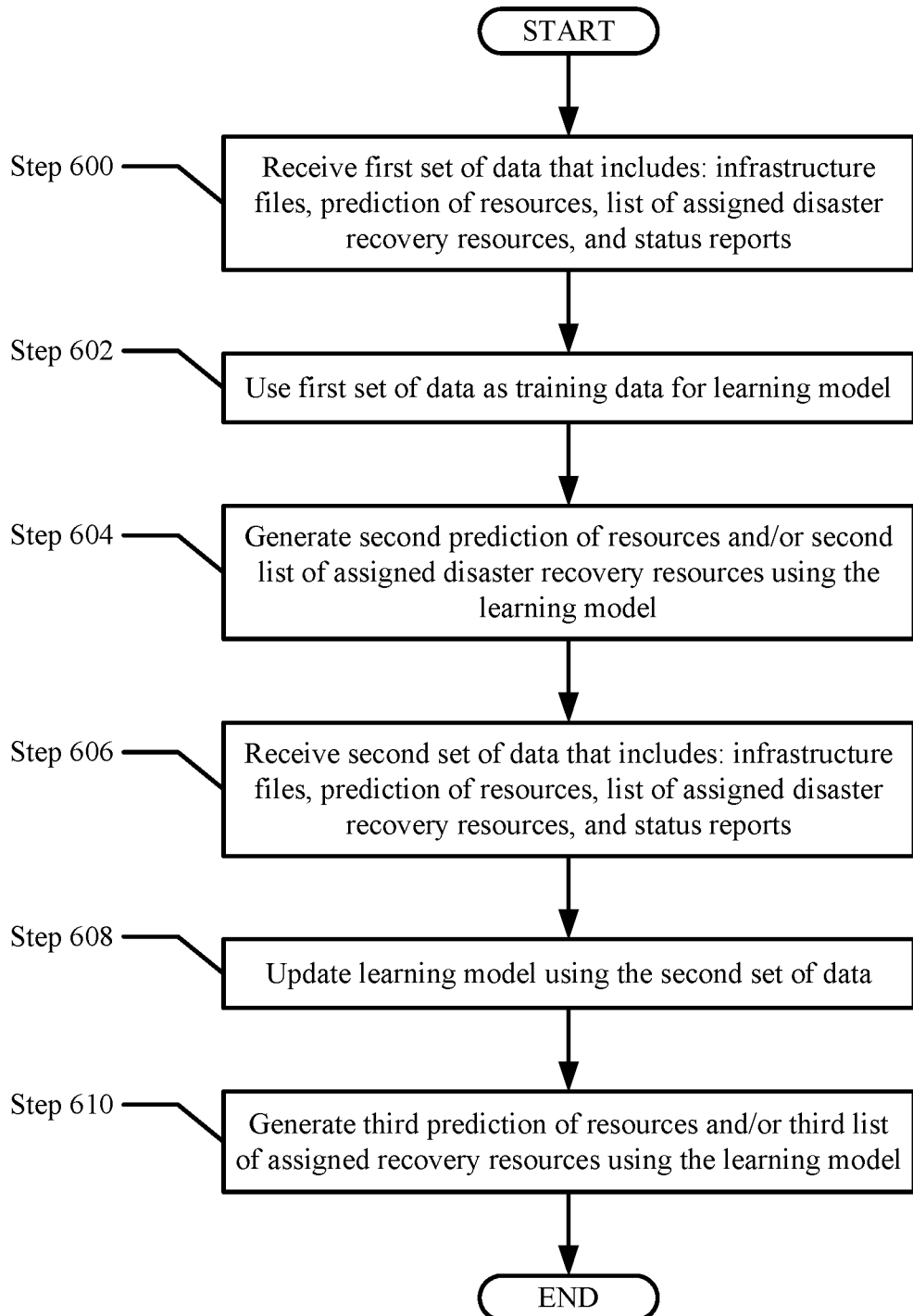
FIG. 6 shows a method in accordance with one or more embodiments of the invention.

FIG. 6 shows a method generally for establishing planning for and preparing systems for disaster recovery operations. For example, when a data center becomes unavailable for any reason, other systems may step in the place of the unavailable data center to provide some or all of the functionality of the unavailable data center. In doing so, a disaster recovery operation can very quickly and efficiently be initiated such that the lapse in services provided by the unavailable data center is minimized and/or eliminated. Further, planning ahead of a data center becoming unavailable enables the disaster recovery operations to: more efficiently utilize disaster recovery resources, be proactive rather than reactive, and enable disaster recovery to be provided as a service, thereby eliminating the need for redundant hardware that is used only when a data center becomes unavailable.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable continued servicing of requests sent from client devices when a data center is experiencing a failure or is otherwise unable to process requests.

Turning now to FIG. 6, the method shown in FIG. 6 may be executed by, for example, the above-discussed learning model (e.g., 208, FIG. 2, 308, FIG. 3). Other components of the system (100) illustrated in FIG. 1 may also execute all or part of the method shown in FIG. 6 without departing from the scope of the invention.

In Step 600, the learning model receives a first set of data that includes one or more infrastructure files, a prediction of resources, a list of assigned disaster recovery resources, and a status report of an application that used disaster recovery resources. In one or more embodiments, the first set of data is received from one or more data centers and/or one or more cloud systems. The first data set may include a complete picture of the data center infrastructure, the prediction of resources needed to provide one or more services provided by the data center, the list of disaster recovery resources assigned to each application, and how the application performed during a disaster recovery operation. The amount of data in the first data set may be of such a large amount that no human is able to make any inferences from the data without the aid of a computer-implemented method.

In Step 602, the learning model uses the first set of data as training data to generate a trained learning model. In one or more embodiments, only a portion of the data is used as training data to generate the trained learning model and may be based on the type of data. For example, only the list of assigned disaster recovery resources and status reports may be used to train the trained learning model.

In Step 604, the trained learning model generates a second prediction of resources and/or a second list of assigned disaster recovery resources. After training the trained learning model in Step 602, the trained learning model may be capable of making inferences that no human would be capable of making, which may provide useful results. Further, the generation of the prediction of resources may be used in place of Step 408, and the generation of the list of assigned resources may be used in place of Steps 418 and/or 422. Further, the generation of the prediction of resource may be combined with the prediction made in Step 408, and the generation of the list of assigned resources may be combined with the list of assigned resources generated in Steps 418 and/or 422.

In Step 606, the trained learning model receives a second set of data that includes one or more infrastructure files, a prediction of resources, a list of assigned disaster recovery resources, and a status report of an application that used disaster recovery resources, which may all be different than the data received in the first set of data. Over time, more data is generated and may be useable to update the learning model. As such, continuing to provide the trained learning model with more data may increase the functionality of the learning model.

In Step 608, the trained learning model is updated using the second set of data to generate an updated learning model. Further, the data included in the second set of data may include data generated by the trained learning model in Step 604, along with the direct effects of that data. As such, updating the trained learning model in this manner may provide a feedback loop to the trained learning model, thereby providing negative feedback for bad outputs and positive feedback for good outputs.

In Step 610, the updated learning model generates a third prediction of resources and/or a third list of assigned disaster recovery resources. After training the trained learning model in Step 602 and updating the learning model in Step 608, the updated learning model may be capable of making inferences that no human would be capable of making, which may provide useful results. Further, the generation of the prediction of resources may be used in place of Step 408, and the generation of the list of assigned resources may be used in place of Steps 418 and/or 422. Further, the generation of the prediction of resource may be combined with the prediction made in Step 408, and the generation of the list of assigned resources may be combined with the list of assigned resources generated in Steps 418 and/or 422. As such, the method described in this FIG. 6 may be seen as a supplement to and/or replacement for portions of the method described in FIG. 4.

In one or more embodiments, the learning model is periodically provided with additional data sets containing similar types of data as the first and second data sets and updated using these additional data sets. As such, the learning model may be changed and improved over time as more data is generated and fed into the learning model.

The method may end following Step 610.

FIGS. 7.1-7.3 show a method generally for restoring the functionality of a failed data center using portions of the methods described in FIGS. 4.1-6. For example, when a data center experiences a failure, it may require a user to take actions to repair, replace, and/or rebuild some or all of the data center. The method of FIGS. 7.1-7.3 enables such a user to be provided with information of inventory and/or configurations of devices and applications that were located and/or operating in the data center prior to the failure. As such, the time to bring the data center back to a normally operating state may be greatly reduced, errors in bring the data center back to a normally operating state may be greatly reduced, and ongoing errors after re-establishing the data center may be greatly reduced.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable a data center experiencing a failure to more quickly be brought back to normal operating conditions.

Turning now to FIGS. 7.1 and 7.2, the method shown in FIGS. 7.1 and 7.2 may be executed by, for example, the above-discussed cloud module (e.g., 300, FIG. 3). Other components of the system (100) illustrated in FIG. 1 may also execute all or part of the method shown in FIGS. 7.1 and 7.2 without departing from the scope of the invention.

In Step 700, the cloud module determines that a data center has experienced a failure. The failure indicates that the data center is unavailable and that the cloud module should initiate disaster recovery operations. In one or more embodiments, the determination is based on expecting to receive a heartbeat signal and not receiving one.

In Step 702, the cloud module receives a request from a client device (e.g. 130, FIG. 1) to view an infrastructure file. As previously discussed, the cloud system may include information regarding the data center that has experienced a failure. A user that is performing a recovery operation of the failed data center may want to access the information on the cloud system to aid in the recovery operation.

In Step 704, the cloud module determines an access level of the user of the client device from which the request is received. If the access level of the user is below a threshold value, then the cloud module will deny access to the infrastructure file and send a notification to the client device that access is denied and the method will end. If the access level of the user is above a threshold value, then the cloud module will allow the user to view the infrastructure file and the method will continue. By checking the access level of the user, the cloud module provides another layer of security to the sensitive information that may be included in the infrastructure file.

In Step 706, the cloud module sends to or displays on the client device power and temperature information using an infrastructure file. The power and temperature information may include the power inventory and temperature inventory information, respectively, and described above. Further, the cloud module may also display on a UI a map of where each power and temperature device was located in the data center prior to the failure. The cloud module may perform Step 706 in response to either Step 704 or Step 700.

In Step 708, the cloud module receives a first confirmation from the client device that the power and temperature devices are installed and configured. In one or more embodiments, a user may utilize the display provided in Step 706 to install and configure the power and temperature devices and then provide an input to the client device that the power and temperature devices are installed and configured. The input may then be sent to the cloud module as the first confirmation.

In Step 710, in response to the first confirmation, the cloud module sends to or displays on the client device hardware and SAN information using an infrastructure file. The hardware information may refer to the hardware inventory described above and SAN information may refer to the database/storage inventory described above. Further, the cloud module may also display on a UI a map of where each hardware and SAN device was located in the data center prior to the failure.

In Step 712, the cloud module receives a second confirmation from the client device that the hardware and SAN devices are installed and configured. In one or more embodiments, a user may utilize the display provided in Step 710 to install and configure the hardware and SAN devices and then provide an input to the client device that the hardware and SAN devices are installed and configured. The input may then be sent to the cloud module as the second confirmation.

In Step 714, in response to the second confirmation, the cloud module sends to or displays on the client device network and connectivity information using an infrastructure file. The network and connectivity information may refer to the network and connectivity inventory described above. Further, the cloud module may also display on a UI a map of where each network and connectivity device was located in the data center prior to the failure. Further, the display on the UI may also include a visual indication of what other devices each device is connected to so that a user may install the devices in the proper locations, but also connect each device to other devices properly.

In Step 716, the cloud module receives a third confirmation from the client device that the network and connectivity devices are installed and configured. In one or more embodiments, a user may utilize the display provided in Step 714 to install and configure the network and connectivity devices and then provide an input to the client device that the network and connectivity devices are installed and configured. The input may then be sent to the cloud module as the third confirmation. In addition, the third confirmation may indicate that all of the above-described devices are properly connected to one another. In addition, the third confirmation may indicate that all devices in the data center are properly installed and configured and that the data center is ready to start receiving data.

In Step 718, the cloud module sends one or more snapshots to the client module in response to the third confirmation. The snapshots may include data generated before and/or after the determination in Step 700. As such, the data center may be returned to a state before experiencing a failure or may include additional data that was generated while the data center was experiencing a failure.

In Step 720, the cloud module sends to or displays on the client device and/or a display of the data center application information in response to the third information. The application information may refer to the previously discussed application inventory. In one or more embodiments, the application information includes data used by the associated application, configuration settings of the associated application, version number of the associated application, or any other information relating to the state and/or use of the application. The user may refer to the application information to ensure all applications are properly installed and configured. At this point, the data center is ready to begin normal operations. Further, each of the Steps 708-720 may be partially performed such that the data center does not yet have the same functionality as before experiencing a failure, but has sufficient functionality to begin performing at least some operations. As such, the data center may begin providing services while restoration of other portions of the data center continues.

In Step 722, the cloud module determines that the data center has resumed normal functionality. In one or more embodiments, the determination is based on receiving a heartbeat signal from the data center.

In Step 724, based on the determination in Step 722, the cloud module performs end of disaster recovery operations. In one or more embodiments, the end of disaster recovery operations include stopping the applications initiated in Step 508, sending standby signals to the disaster recovery resources, sending snapshots generated in Step 512 to the data center module, and clearing configurations and/or files used and/or generated in the disaster recovery operations. In one or more embodiments, the cloud module may keep a copy of one or more of the snapshots to ensure data continuity in case the data center becomes unavailable again. In one or more embodiments, the end of disaster recovery operations causes the cloud module to return to a state it was in prior to the determination in Step 700.

The method may end following step 724.

Turning now to FIG. 7.3, the method shown in FIG. 7.3 may be executed by, for example, the above-discussed data center module (e.g., 200, FIG. 2). Other components of the system (100) illustrated in FIG. 1 may also execute all or part of the method shown in FIG. 7.3 without departing from the scope of the invention.

In Step 726, the data center module receives snapshots sent from the cloud module. For example, the snapshots may be the snapshots sent in Step 718. The data center module may receive the snapshots in response to sending a request for the snapshots to the cloud module, a user input on the client device, or automatically based on a determination that the client module is operating.

In Step 728, the data center module deploys the snapshot received in Step 726 to the data center infrastructure. The snapshots may include data generated before and/or after the determination in Step 700. As such, the data center may be returned to a state before experiencing a failure or may include additional data that was generated while the data center was experiencing a failure.

In Step 730, the data center module validates complete connectivity of the data center. In one or more embodiments, the data center module may reference an infrastructure file to check that all devices in the infrastructure file are properly installed and properly configured. In one or more embodiments, the data center module sends a ping to each device to ensure proper connectivity and configuration of the device based on the devices response to the ping. In one or more embodiments, the data center module provides a checklist to a user to follow and ensure complete connectivity. In such an embodiment, the user may enter an input after completing the checklist that the user verifies complete connectivity. In one or more embodiments, validating connectivity also includes checking that all applications running on the data center are operating properly and under normal conditions.

In Step 732, the data center module initiates sending heartbeat signals to the cloud module. The heartbeat signals indicate to the cloud module that the data center is operating under normal conditions and that disaster recovery operations may end. Further, the initiation of the heartbeat signals may be in response to the data center continuing to operate and provide services under normal conditions.

The method may end following Step 732.

Turning now to FIG. 8, FIG. 8 shows a diagram of a computing device in accordance with one or more embodiments of the invention.

In one or more embodiments of the invention, the computing device (800) may include one or more computer processors (802), non-persistent storage (804) (e.g., volatile memory, such as RAM, cache memory), persistent storage (806) (e.g., a hard disk, an optical drive such as a CD drive or a DVD drive, a Flash memory, etc.), a communication interface (812) (e.g., Bluetooth interface, infrared interface, network interface, optical interface, etc.), an input device(s) (810), an output device(s) (808), and numerous other elements (not shown) and functionalities. Each of these components is described below.

In one or more embodiments, the computer processor(s) (802) may be an integrated circuit for processing instructions. For example, the computer processor(s) (802) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (e.g., a LAN, a WAN, Internet, mobile network, etc.) and/or to another device, such as another computing device.

In one or more embodiments, the computing device (800) may include one or more output devices (808), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for recovering a data center, the method comprising:
    making a determination, by a cloud module, that the data center has experienced a failure;
    sending, by the cloud module and in response to the determination, an infrastructure file comprising data center infrastructure information to a client device;
    receiving, after sending the infrastructure file, a confirmation from the client device that at least a portion of data center infrastructure is installed;
    sending, from the cloud module to a data center module, a snapshot in response to the confirmation;
    deploying, by the data center module, the snapshot at the data center;
    after the deploying, validating, by the data center module, complete connectivity of data center;
    sending, by the data center module, a heartbeat signal to the cloud module in response to the validating; and
    sending, by the cloud module, a standby signal to disaster recovery resources in response to receiving the heartbeat signal.

2. The method of claim 1, wherein the data center infrastructure information comprises at least one of: power information, temperature information, hardware information, storage area network (SAN) information, network information, connectivity information, and application information.

3. The method of claim 2, wherein receiving the confirmation comprises:
    receiving a second confirmation that power and temperature devices are installed;
    receiving a third confirmation that hardware and SAN devices are installed; and
    receiving a fourth confirmation that network and connectivity devices are installed.

4. The method of claim 1, further comprising:
    receiving, from the client device, a request to view the infrastructure file; and
    making a second determination that an access level associated with a user of the client device is above a threshold value, and wherein sending the infrastructure file is based on the second determination.

5. The method of claim 1, wherein the infrastructure file is sent by the data center module to the cloud module before the determination.

6. The method of claim 5, wherein the snapshot comprises data generated before and after the determination.

7. The method of claim 1, wherein the heartbeat signal is indicative of the data center operating normally.

8. The method of claim 1, wherein the snapshot was sent to the cloud module before the determination.

9. The method of claim 1, further comprising:
    receiving, at the cloud module, the infrastructure file from the data center module before the determination.

10. A method for recovering a data center, the method comprising:
  making a determination that the data center has experienced a failure;
  causing, based on the determination, display of data center infrastructure information on a client device;
  receiving, after causing display of data center infrastructure information, a confirmation from the client device that at least a portion of the data center infrastructure is installed;
  sending, based on the confirmation, a snapshot to the data center; and
  sending a standby signal to disaster recovery resources in response to receiving a heartbeat signal from the data center.

11. The method of claim 10, wherein the data center infrastructure information comprises at least one of: power information, temperature information, hardware information, storage area network (SAN) information, network information, connectivity information, and application information.

12. The method of claim 10, wherein receiving the confirmation comprises:
  receiving a second confirmation that power and temperature devices are installed;
  receiving a third confirmation that hardware and SAN devices are installed; and
  receiving a fourth confirmation that network and connectivity devices are installed.

13. The method of claim 10, further comprising:
  receiving, from the client device, a request to view the data center infrastructure information; and
  making a second determination that an access level associated with a user of the client device is above a threshold value, and wherein the causing to display is based on the second determination.

14. The method of claim 10, wherein the data center infrastructure information is sent by a data center module in the data center before the determination.

15. The method of claim 10, wherein the snapshot comprises data generated before and after the determination.

16. The method of claim 10, wherein the heartbeat signal is indicative of the data center operating normally.

17. The method of claim 10, further comprising:
  receiving the snapshot before the determination.

18. A method for recovering a data center, the method comprising:
  receiving, at a data center module, a snapshot from a cloud module, wherein the snapshot comprises data generated before and after a failure of the data center;
  deploying, by the data center module, the snapshot at the data center;
  validating, by the data center module and after the deploying, complete connectivity of data center; and
  sending, by the data center module, a heartbeat signal to the cloud module in response to the validating.

19. The method of claim 18, further comprising:
  receiving, at the data center module, a confirmation that at least a portion of data center infrastructure is installed, and wherein validating is in response to receiving the confirmation.

20. The method of claim 18, wherein the heartbeat signal is indicative of the data center operating normally.

* * * * *